United States Patent
Salman et al.

(10) Patent No.: US 11,048,000 B2
(45) Date of Patent: Jun. 29, 2021

(54) SEISMIC IMAGE DATA INTERPRETATION SYSTEM

(71) Applicant: Schlumberger Technology Corporation, Sugar Land, TX (US)

(72) Inventors: Nader Salman, Arlington, MA (US); Francis Grady, Tananger (NO); Paal Kjetil Kvamme, Tananger (NO); Mats Stivang Ramfjord, Oslo (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 16/646,167

(22) PCT Filed: Sep. 12, 2018

(86) PCT No.: PCT/US2018/050746
§ 371 (c)(1),
(2) Date: Mar. 11, 2020

(87) PCT Pub. No.: WO2019/055562
PCT Pub. Date: Mar. 21, 2019

(65) Prior Publication Data
US 2020/0278465 A1     Sep. 3, 2020

Related U.S. Application Data

(60) Provisional application No. 62/557,386, filed on Sep. 12, 2017.

(51) Int. Cl.
*G01V 1/30* (2006.01)
*G01V 1/34* (2006.01)

(52) U.S. Cl.
CPC .............. *G01V 1/301* (2013.01); *G01V 1/306* (2013.01); *G01V 1/345* (2013.01); *G01V 2210/642* (2013.01); *G01V 2210/66* (2013.01)

(58) Field of Classification Search
CPC ........ G01V 1/301; G01V 1/306; G01V 1/345; G01V 2210/642; G01V 2210/66
See application file for complete search history.

(56) References Cited

U.S. PATENT DOCUMENTS 7,069,149 B2 * 6/2006 Goff ...................... G01V 1/30
                                                       702/16
7,162,463 B1 * 1/2007 Wentland ............... G01V 11/00
                                                       706/48

(Continued)

OTHER PUBLICATIONS

Branco, et al., "A survey of Predictive Modelling under Imballanced Distributions," May 14, 2015.
(Continued)

*Primary Examiner* — Raymond L Nimox
(74) *Attorney, Agent, or Firm* — Colin L. Wier

(57) ABSTRACT

A method can include receiving seismic image data of a geologic region and interpretation information of the seismic image data for a geologic feature in the geologic region, where the seismic image data include a geologic feature class imbalance; shifting the geologic feature class imbalance toward a class of the geologic feature by increasing the spatial presence of the geologic feature in the seismic image data to generate training data; and training a neural network using the training data to generate a trained neural network.

14 Claims, 17 Drawing Sheets

(56) References Cited

U.S. PATENT DOCUMENTS

| | | | |
|---|---|---|---|
| 2009/0119018 A1 | 5/2009 | Priezzhev et al. | |
| 2010/0161232 A1* | 6/2010 | Chen | G01V 1/302 702/16 |
| 2013/0151161 A1 | 6/2013 | Imhof et al. | |
| 2013/0345985 A1* | 12/2013 | Priezzhev | G01V 1/301 702/14 |
| 2015/0073715 A1* | 3/2015 | Aarre | G01V 1/345 702/14 |
| 2015/0212224 A1* | 7/2015 | Williams | G01V 1/288 702/14 |
| 2015/0241584 A1* | 8/2015 | Aarre | G01V 1/36 367/7 |
| 2015/0355353 A1* | 12/2015 | Whitaker | G01V 1/345 702/14 |
| 2015/0362623 A1* | 12/2015 | Miotti | G01V 11/00 702/14 |
| 2016/0086079 A1* | 3/2016 | De Stefano | G06N 3/08 706/12 |
| 2017/0205531 A1* | 7/2017 | Berard | E21B 47/002 |
| 2017/0254910 A1* | 9/2017 | Can | G01V 1/301 |
| 2020/0160173 A1* | 5/2020 | Pandey | G06N 3/08 |

OTHER PUBLICATIONS

International Search Report and Written Opinion for the counterpart International patent application PCT/US2018/050746 dated Feb. 13, 2019.

International Preliminary Report on Patentability for the counterpart International patent application PCT/US2018/050746 dated Mar. 26, 2020.

Ying Jiang, "Detecting Geological Structures in Seismic Volumes Using Deep Convolutional Neural Networks," Master Thesis, retrieved from the Internet: URL: https://www.vrgeo.org/wp-content/uploads/2019/01/Ying_Jiang-Detecting_Geological_Structures_in_Seismic_Volumes_Using_Deep_Convolutional_Neural_Networks.pdf [retrieved on Nov. 13, 2018].

Haoyu et al., "Imbalance Aware Lithography Hotspot Detection: A Deep Learning Approach," Proc. of SPIE, vol. 10148, 2017, SPIE, 16 pages.

Extended European Search Report of the counterpart European Patent Application No. 18856582.4 dated May 12, 2021.

* cited by examiner

910

930

1210                                  1230

Fault Pixels: X1 of Z          Fault Pixels: X2 of Z
No Fault Pixels: Y1 of Z       No Fault Pixels: Y2 of Z X2 > X1 & Y2 < Y1
Z = constant 1310          1330

1410

1420

1430

1440

1450

1460

1470

SEISMIC IMAGE DATA INTERPRETATION SYSTEM

RELATED APPLICATIONS

This application claims priority to and the benefit of a U.S. Provisional Application having Ser. No. 62/557,386, filed 12 Sep. 2017, which is incorporated by reference herein.

BACKGROUND

In oil and gas exploration, interpretation is a process that involves analysis of data to identify and locate various subsurface structures (e.g., horizons, faults, geobodies, etc.) in a geologic environment. Various types of structures may be indicative of hydrocarbon traps or flow channels, as may be associated with one or more reservoirs (e.g., fluid reservoirs). In the field of resource extraction, enhancements to interpretation can allow for construction of a more accurate model of a subsurface region, which, in turn, may improve characterization of the subsurface region for purposes of resource extraction. Characterization of one or more subsurface regions in a geologic environment can guide, for example, performance of one or more operations (e.g., field operations, etc.). As an example, a more accurate model of a subsurface region may make a drilling operation more accurate as to a borehole's trajectory where the borehole is to have a trajectory that penetrates a reservoir, etc.

SUMMARY

A method can include receiving seismic image data of a geologic region and interpretation information of the seismic image data for a geologic feature in the geologic region, where the seismic image data include a geologic feature class imbalance; shifting the geologic feature class imbalance toward a class of the geologic feature by increasing the spatial presence of the geologic feature in the seismic image data to generate training data; and training a neural network using the training data to generate a trained neural network. A system can include a processor; memory; processor-executable instructions executable by the processor to instruct the system to: receive seismic image data of a geologic region and interpretation information of the seismic image data for a geologic feature in the geologic region, where the seismic image data include a geologic feature class imbalance; shift the geologic feature class imbalance toward a class of the geologic feature by increasing the spatial presence of the geologic feature in the seismic image data to generate training data; and train a neural network using the training data to generate a trained neural network. One or more computer-readable storage media can include computer-executable instructions to instruct a computing system where the instructions include instructions to: receive seismic image data of a geologic region and interpretation information of the seismic image data for a geologic feature in the geologic region, where the seismic image data include a geologic feature class imbalance; shift the geologic feature class imbalance toward a class of the geologic feature by increasing the spatial presence of the geologic feature in the seismic image data to generate training data; and train a neural network using the training data to generate a trained neural network.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
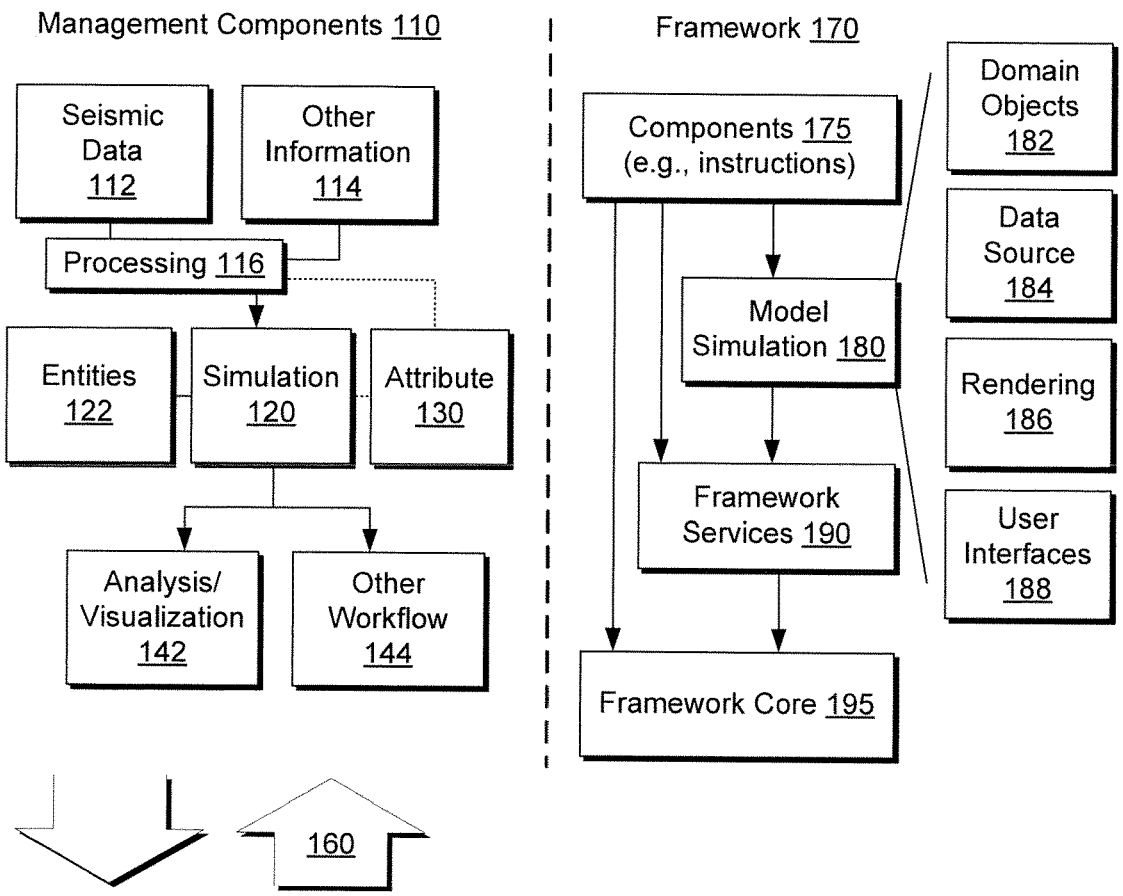
FIG. 1 illustrates an example system that includes various components for modeling a geologic environment and various equipment associated with the geologic environment.
Figure 1:
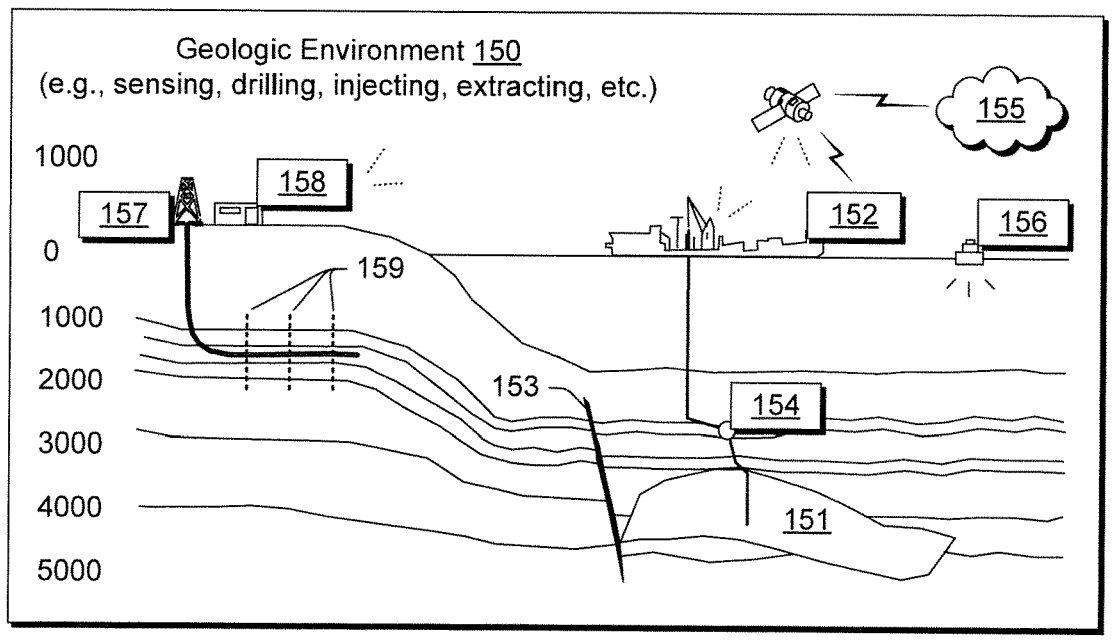

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Displacements that occur in the Earth can give to offsets of segments or points that were once continuous or adjacent. Layers of rock that have been moved by the action of faults show displacement on either side of the fault surface. A fault can be characterized as a break or planar surface in rock across which there is observable displacement. Depending on the relative direction of displacement between the rocks, or fault blocks, on either side of the fault, movement may be classified as normal, reverse or strike-slip. According to terminology derived from the mining industry, the fault block above the fault surface is called the hanging wall, while the fault block below the fault is the footwall. Given the geological complexity of some faulted rocks and rocks that have undergone more than one episode of deformation, it can be difficult to distinguish between the various types of faults. Also, areas deformed more than once or that have undergone continual deformation might have fault surfaces that are rotated from their original orientations, in such instances interpretation may not be straightforward. In some instances, interpretation becomes a complex task.

In a normal fault, a hanging wall moves down relative to the footwall along the dip of the fault surface, which tends to be steep (e.g., from approximately 45 degrees to approximately 90 degrees). A growth fault is a type of normal fault that forms during sedimentation and tends to have thicker strata on the downthrown hanging wall than the footwall. A reverse fault forms when the hanging wall moves up relative to the footwall parallel to the dip of the fault surface. A thrust fault, sometimes called an overthrust, is a reverse fault in which the fault plane has a shallow dip (e.g., much less than approximately 45 degrees).

Movement of normal and reverse faults can also be oblique as opposed to purely parallel to the dip direction of the fault plane. The motion along a strike-slip fault, also known as a transcurrent or wrench fault, is parallel to the strike of the fault surface, and the fault blocks move sideways past each other. The fault surfaces of strike-slip faults tend to be nearly vertical. A strike-slip fault in which the block across the fault moves to the right can be described as a dextral strike-slip fault. If it moves left, the relative motion can be described as sinistral.

A transform fault is a particular type of strike-slip fault that is a boundary of an oceanic tectonic plate. The actual movement of a transform fault is opposite to its apparent displacement. The presence of a fault may be detectable by observing characteristics of rocks such as changes in lithology from one fault block to the next, breaks and offsets between strata or seismic events, and changes in formation pressure in wells that penetrate both sides of a fault. Some fault surfaces contain relatively coarse rubble that can act as a conduit for migrating oil or gas (e.g., a conduit with porosity, etc.); whereas the surfaces of other faults are smeared with impermeable clays or broken grains that can act as a fault seal.

As mentioned, a geologic formation can deform over time. Deformation may effect one or more field operations (e.g., drilling, casing, cementing, measuring, production, injection, etc.) and may effect equipment deployed in a borehole or to be deployed in a borehole (e.g., whether cased, uncased, etc.). Deformation can cause one or more faults to form. As an example, production may cause changes in a region where such changes may be observable in seismic images.

Seismic reflection technology and techniques to image subsurface structure can involve performing one or more surveys where, for example, geometry of one or more sources and one or more receivers tend to be known (e.g., according to an acquisition geometry). As an example, seismic imaging can include processing of seismic image data using one or more processors via a process akin to triangulation, though more complex, which aims to place reflections in their proper locations with (e.g., more-or-less) proper amplitudes, which can then be interpreted. In reflection seismology, the amplitudes tend to be indicative of relative changes in impedance, and, for a 3D spatial survey, a seismic volume (e.g., volumetric seismic image data) can be processed to yield impedances of subsurface material between reflecting boundaries.

As an example, a seismic image can be part of a time-series study. For example, consider a four-dimensional (4D) seismic survey or study where three-dimensional (3D) seismic data are acquired at different times over a common region in an effort to assess changes in a producing hydrocarbon reservoir with time. Changes may be observed in fluid location and saturation, pressure and temperature. 4D seismic data is one of several forms of time-lapse seismic data. Such data can be acquired via land equipment (e.g., receivers on land, in boreholes, etc.) and/or marine equipment (e.g., receivers of streamers, of ocean bottom nodes, in boreholes, etc.).

As an example, a geomechanical simulation of a modeled geologic environment can provide information germane to how material in the geologic environment deforms. Further, where a geologic environment includes a reservoir, a reservoir simulation can provide information germane to material deformation. For example, consider simulating a reservoir where one or more wells inject fluid into and/or produce fluid from the reservoir over some period of time.

FIG. 1 shows an example of a system 100 that includes various management components 110 to manage various aspects of a geologic environment 150 (e.g., an environment that includes a sedimentary basin, a reservoir 151, one or more fractures 153, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities, geological objects or other objects such as wells, surfaces, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. An example of an object-based framework is the MICROSOFT™ .NET™ framework (Redmond, Wash.), which provides a set of extensible object classes. In the .NET™ framework, an object class encapsulates a component of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE® reservoir simulator (Schlumberger Limited, Houston Tex.), the INTERSECT® reservoir simulator (Schlumberger Limited, Houston Tex.), etc. As an example, a reservoir or reservoirs may be simulated with respect to one or more enhanced recovery techniques (e.g., consider a thermal process such as SAGD, etc.).

In an example embodiment, the management components 110 may include features of a framework such as the PETREL® framework (Schlumberger Limited, Houston, Tex.). The PETREL® framework provides components that allow for optimization of exploration and development operations. The PETREL® framework includes seismic to simulation software components that can be executed in hardware to output information for use in increasing reservoir performance, for example, by improving asset team productivity. Through use of such a framework, various professionals (e.g., geophysicists, geologists, well engineers, reservoir engineers, etc.) can develop collaborative workflows and integrate operations to streamline processes. Such a framework may be considered an application and may be considered a data-driven application (e.g., where data is input for purposes of modeling, simulating, etc.).

The PETREL® framework can include components for implementation of a cognitive environment, which can include machine learning, training of machines and use of trained machines. As an example, the PETREL® framework can include one or more cloud-based components, for example, for purposes of computations, access, data storage, transmission of instructions to equipment, etc. A cloud framework may be included in a system that can provision and utilize resources (e.g., AZURE® cloud framework, etc.).

The PETREL® framework can be implemented to unite planning and operations, for example, consider one or more planning tasks performed via the framework and one or more planned tasks being executed during field operations. As an example, a framework can include issuing one or more instructions via one or more networks to one or more pieces of field equipment to cause such equipment to perform one or more operations (e.g., data acquisition, sensing, moving, fracturing, drilling, tripping, casing, lifting via gas lift equipment, lifting via pump equipment, etc.).

As an example, a framework can include components to automate and accelerate complex functions such as modeling, simulation, analysis, and forecasting. Such advanced computational capabilities can be based on insights from lab and/or field measurements, datasets across a range of diverse sources.

As an example, seismic image data may be processed using a framework such as the OMEGA® framework (Schlumberger Limited, Houston, Tex.). The OMEGA® framework provides features that can be implemented for processing of seismic image data (e.g., seismic data), for example, through prestack seismic interpretation and seismic inversion. A framework may be scalable such that it enables processing and imaging on a single workstation, on a massive compute cluster, cloud resources, etc. As an example, one or more techniques, technologies, etc. described herein may optionally be implemented in conjunction with a framework such as, for example, the OMEGA® framework.

As an example, one or more sets of instructions can be stored in a storage device (e.g., a drive, etc.) that may be utilized in conjunction with a framework such as the OMEGA® framework (e.g., consider a plug-in, add-on, integrated component, etc.). As an example, consider fault analysis instructions stored in a storage device that is accessible to perform processor-based calculations and other operations associated with interpretation of seismic image data, for example, to identify one or more faults in a geologic region. Identification of a fault can include determining one or more parameters or parameter values that characterize the fault. For example, consider fault location, position, dimension(s), type of fault, etc.

A framework for processing data may include features for 2D line and 3D seismic surveys. Components for processing seismic data may include features for prestack seismic interpretation (PSI), optionally pluggable into a framework such as the OCEAN® framework. A workflow may be specified to include processing via one or more frameworks, plug-ins, add-ons, etc. A workflow may include quantitative interpretation, which may include performing pre- and poststack seismic data conditioning, inversion (e.g., seismic to properties and properties to synthetic seismic), wedge modeling for thin-bed analysis, amplitude versus offset (AVO) and amplitude versus angle (AVA) analysis, reconnaissance, etc. As an example, a workflow may aim to output rock properties based at least in part on processing of seismic data. As an example, various types of data may be processed to provide one or more models (e.g., earth models). For example, consider processing of one or more of seismic data, well data, electromagnetic and magnetic telluric data, reservoir data, etc.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In an example embodiment, various aspects of the management components 110 may include add-ons or plug-ins that operate according to specifications of a framework environment. For example, consider the OCEAN® framework environment (Schlumberger Limited, Houston, Tex.), which allows for integration of add-ons (or plug-ins) into a PETREL® framework workflow. The OCEAN® framework environment leverages various computational tools and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a components layer 175. The framework 170 may include features of the OCEAN® framework where the model simulation layer 180 includes features of the PETREL® framework (e.g., as to modeling), for example, which can host OCEAN® framework applications. In an example embodiment, the PETREL® framework can include features for model building and visualization.

The model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

In the example of FIG. 1, the domain objects 182 can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and that may be intersected by a fault 153. As an example, the geologic environment 150 may be outfitted with one or more of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a workflow may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow can include issuing instructions to one or more pieces of field equipment (see, e.g., the equipment 152, 154, 156, 157, 158, etc. of FIG. 1). As mentioned, information about the geologic environment 150 may become available as feedback 160, which may provide for processing that outputs information that can be utilized to instruct one or more pieces of field equipment.

As an example, a workflow may be a workflow implementable in a computational framework, for example, that operates on seismic data, seismic attribute(s), etc. As an example, a workflow may be a process implementable at least in part in a cloud-based framework. As an example, a workflow may include one or more worksteps that access a component such as a plug-in (e.g., external executable code, etc.).

Figure 2:
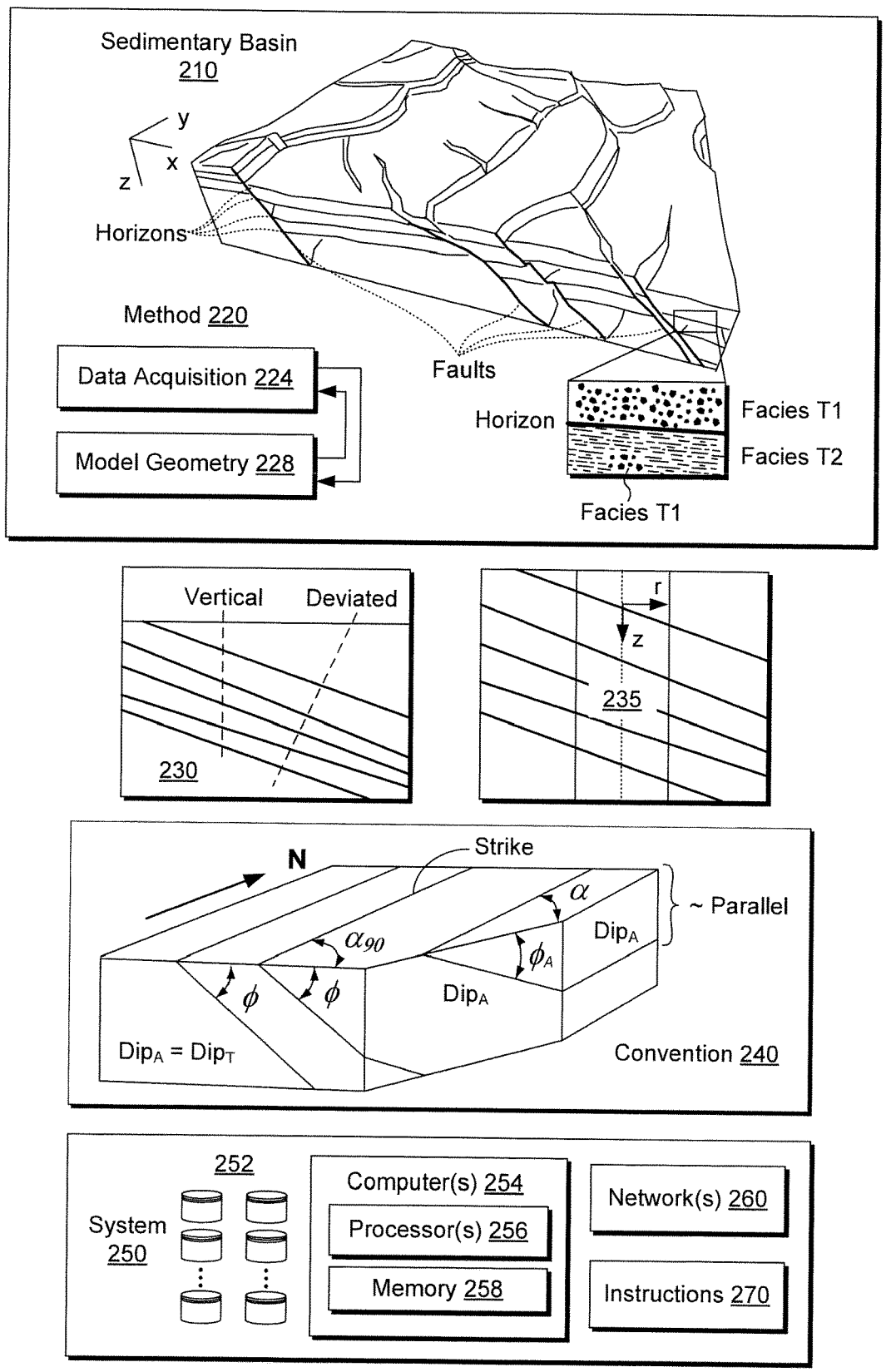
FIG. 2 illustrates an example of a sedimentary basin, an example of a method, an example of a formation, an example of a borehole, an example of a convention and an example of a system.

FIG. 2 shows an example of a sedimentary basin 210, an example of a method 220 for model building (e.g., for a simulator, etc.), an example of a formation 230, an example of a borehole 235 in a formation, an example of a convention 240 and an example of a system 250.

As an example, reservoir simulation, petroleum systems modeling, etc. may be applied to characterize various types of subsurface environments, including environments such as those of FIG. 1. Results therefrom may, for example, be utilized to control one or more pieces of field equipment to perform one or more field operations associated with exploration (e.g., sensing, drilling, etc.) and/or production of hydrocarbons (e.g., drilling, fracturing, etc.).

In FIG. 2, the sedimentary basin 210, which is a geologic environment, includes horizons, faults and facies formed over some period of geologic time. These features are distributed in two or three dimensions in space, for example, with respect to a Cartesian coordinate system (e.g., x, y and z) or other coordinate system (e.g., cylindrical, spherical, etc.). As shown, the model building method 220 includes a data acquisition block 224 and a model geometry block 228. Some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic data, remote-sensing, electromagnetic, gravity, outcrop and well log data. Furthermore, data may include depth and thickness maps stemming from facies variations (e.g., due to seismic unconformities) assumed to following geological events ("iso" times) and data may include lateral facies variations (e.g., due to lateral variation in sedimentation characteristics).

To proceed to modeling of geological processes, data may be provided, for example, data such as geochemical data (e.g., temperature, kerogen type, organic richness, etc.), timing data (e.g., from paleontology, radiometric dating, magnetic reversals, rock and fluid properties, etc.) and boundary condition data (e.g., heat-flow history, surface temperature, paleowater depth, etc.).

In basin and petroleum systems modeling quantities such as temperature, pressure and porosity distributions within the sediments may be modeled by solving partial differential equations (PDEs) using a finite element method (e.g., or other numerical technique). Modeling may also model geometry with respect to time, for example, to account for changes stemming from geological events (e.g., deposition of material, erosion of material, shifting of material, etc.).

A modeling framework such as the PETROMOD® framework (Schlumberger Limited, Houston, Tex.) includes features for input of various types of information (e.g., seismic, well, geological, etc.) to model evolution of a sedimentary basin.

As shown in FIG. 2, the formation 230 includes a horizontal surface and various subsurface layers. As an example, a borehole may be vertical. As another example, a borehole may be deviated. In the example of FIG. 2, the borehole 235 may be considered a vertical borehole, for example, where the z-axis extends downwardly normal to the horizontal surface of the formation 230.

As to the convention 240 for dip, as shown, the three dimensional orientation of a plane can be defined by its dip and strike. Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 240 of FIG. 2, various angles θ indicate angle of slope downwards, for example, from an imaginary horizontal plane (e.g., flat upper surface); whereas, dip refers to the direction towards which a dipping plane slopes (e.g., which may be given with respect to degrees, compass directions, etc.). Another feature shown in the convention of FIG. 2 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 240 of FIG. 2). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 240 of FIG. 2). Apparent dip may be the dip of a plane as measured in any other direction except in the direction of true dip (see, e.g., $\phi_A$ as $Dip_A$ for angle $\alpha$); however, it is possible that the apparent dip is equal to the true dip (see, e.g., $\phi$ as $Dip_A=Dip_T$ for angle $\alpha_{90}$ with respect to the strike). In other words, where the term apparent dip is used (e.g., in a method, analysis, identification, algorithm, control, etc.), for a particular dipping plane, a value for "apparent dip" may be equivalent to the true dip of that particular dipping plane.

As shown in the convention 240 of FIG. 2, the dip of a plane as seen in a cross-section perpendicular to the strike is true dip (see, e.g., the surface with $\phi$ as $Dip_A=Dip_T$ for angle $\alpha_{90}$ with respect to the strike). As indicated, dip observed in a cross-section in any other direction is apparent dip (see, e.g., surfaces labeled $Dip_A$). Further, as shown in the convention 240 of FIG. 2, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 240 may be used with respect to an analysis, an interpretation, an attribute, etc. (see, e.g., various blocks of the system 100 of FIG. 1). As an example, various types of features may be described, in part, by dip (e.g., sedimentary bedding, faults and fractures, cuestas, igneous dikes and sills, metamorphic foliation, etc.).

Seismic interpretation may aim to identify and/or classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As shown in FIG. 2, the system 250 includes one or more information storage devices 252, one or more computers 254, one or more networks 260 and one or more sets of instructions 270. As to the one or more computers 254, each computer may include one or more processors (e.g., or processing cores) 256 and memory 258 for storing instructions (e.g., components as instructional components), for example, executable by at least one of the one or more processors. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 252.

As an example, the one or more sets of instructions 270 may include instructions (e.g., stored in memory) executable by one or more processors to instruct the system 250 to perform various actions. As an example, the system 250 may be configured such that the one or more sets of instructions 270 provide for establishing the framework 170 of FIG. 1 or a portion thereof. As an example, one or more methods, techniques, etc. may be performed using one or more sets of instructions, which may be, for example, one or more of the one or more sets of instructions 270 of FIG. 2. As an example, the system 250 can be operatively coupled to one or more pieces of field equipment to, for example, receive information therefrom and/or transmit information thereto (e.g., commands, parameters, parameter values, etc.).

Figure 3:
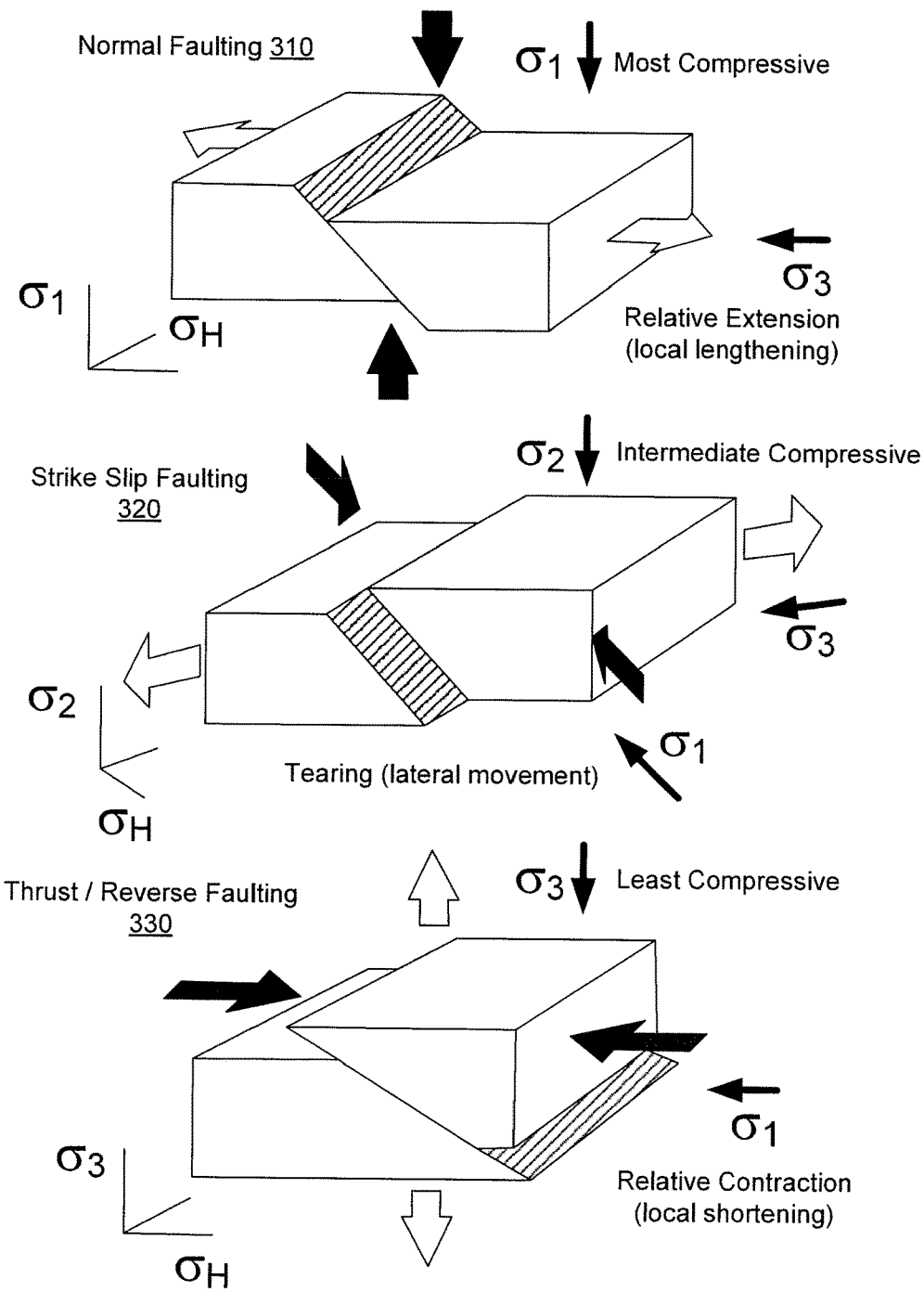
FIG. 3 illustrates an example of a tectonic regime.

FIG. 3 shows an example of a tectonic regime 300 and examples of normal faulting 310, strike slip faulting 320 and thrust or reverse faulting 330. Stress may be defined, for example, as force per unit area acting on a plane. In a solid body, for example, a stress state at a point in the solid body may be described by orientations and magnitudes of three stresses called principal stresses, which are oriented perpendicular to each other (e.g., orthogonal to each other).

As shown in FIG. 3, $\sigma_1$, $\sigma_2$ and $\sigma_3$ are compressive or tensile principal stresses where, in magnitude, 1>2>3. As an example, about a point, the three principal stresses may be shown, or represented, as an ellipsoid where the magnitude of each component defines a maximum along a respective one of the three orthogonal axes. Compressive stress and shortening strain are considered positive in rock mechanics and structural geology because in the Earth the three principal stresses tend to be compressive (e.g., except around underground voids such as caves, very near to the Earth's surface, etc.).

The tectonic regime 300 may be defined by considering one axis being vertical. For example, a normal fault regime corresponds to $\sigma_1$ being vertical, a strike slip fault regime corresponds to $\sigma_2$ being vertical and a thrust or reverse fault regime corresponds to $\sigma_3$ being vertical. The tectonic regime 300 may also define stresses $\sigma_H$, $\sigma_h$ and $\sigma_v$ are the maximum horizontal stress ($\sigma_H$), a minimum horizontal stress ($\sigma_h$) that may be orthogonal to the maximum horizontal stress, and a vertical stress ($\sigma_v$). The orientation of the maximum horizontal stress $\sigma_H$ may be defined by an angle $\theta_H$, which may be local (e.g., for a point or a feature), far field, etc.

As an example, various types of parameters may be germane to field activities such as drilling, well completion, seismic migration velocity model construction, wellbore stability, hydraulic fracturing design and hydraulic fracture monitoring. As an example, as to shale gas reservoirs, knowledge of anisotropy parameters can assist with planning, execution, etc., especially where one or more well configurations may vary over some range between vertical and horizontal.

As an example, information may be acquired about a formation using seismology, for example, to acquire seismic image data. As mentioned, seismic data may be processed using a framework such as, for example, the PETREL® framework, the OMEGA® framework, etc. As an example, such a framework may include one or more interfaces for receipt of seismic image data, other imagery data, etc. Such a framework may include one or more sets of instructions with instructions executable to process received data. As an example, seismic data may optionally be analyzed to determine one or more parameters.

As an example, flow of fluid into and/or out of a reservoir may be modeled and simulated using a reservoir simulator such as, for example, the ECLIPSE® reservoir simulator or the INTERSECT® reservoir simulator. As an example, geomechanics of a basin, a reservoir, etc. may be modeled and simulated using a framework such as, for example, the VISAGE® framework (Schlumberger Limited, Houston, Tex.). As an example, information may be coupled from simulators, frameworks, etc. For example, flow information from a reservoir simulator may be input to a geomechanics framework that can model response of a geologic environment to flow (e.g., injection flow and/or production flow).

As an example, a framework may include one or more sets of instructions that can model stimulation of a geologic environment, for example, to generate one or more fractures. For example, consider the MANGROVE® framework (Schlumberger Limited, Houston, Tex.), which may be operated in conjunction with one or more other frameworks. The MANGROVE® framework may be operated as a hydraulic fracturing simulator and may be, for example, integrated into one or more seismic-to-simulation workflows (e.g., for conventional and/or unconventional reservoirs) and/or one or more other types of workflows. As an example, the MANGROVE® package may be implemented to grid and model complex fractures, which may be used for reservoir simulation (e.g., via the ECLIPSE® framework, the INTERSECT® framework, etc.).

Figure 4:
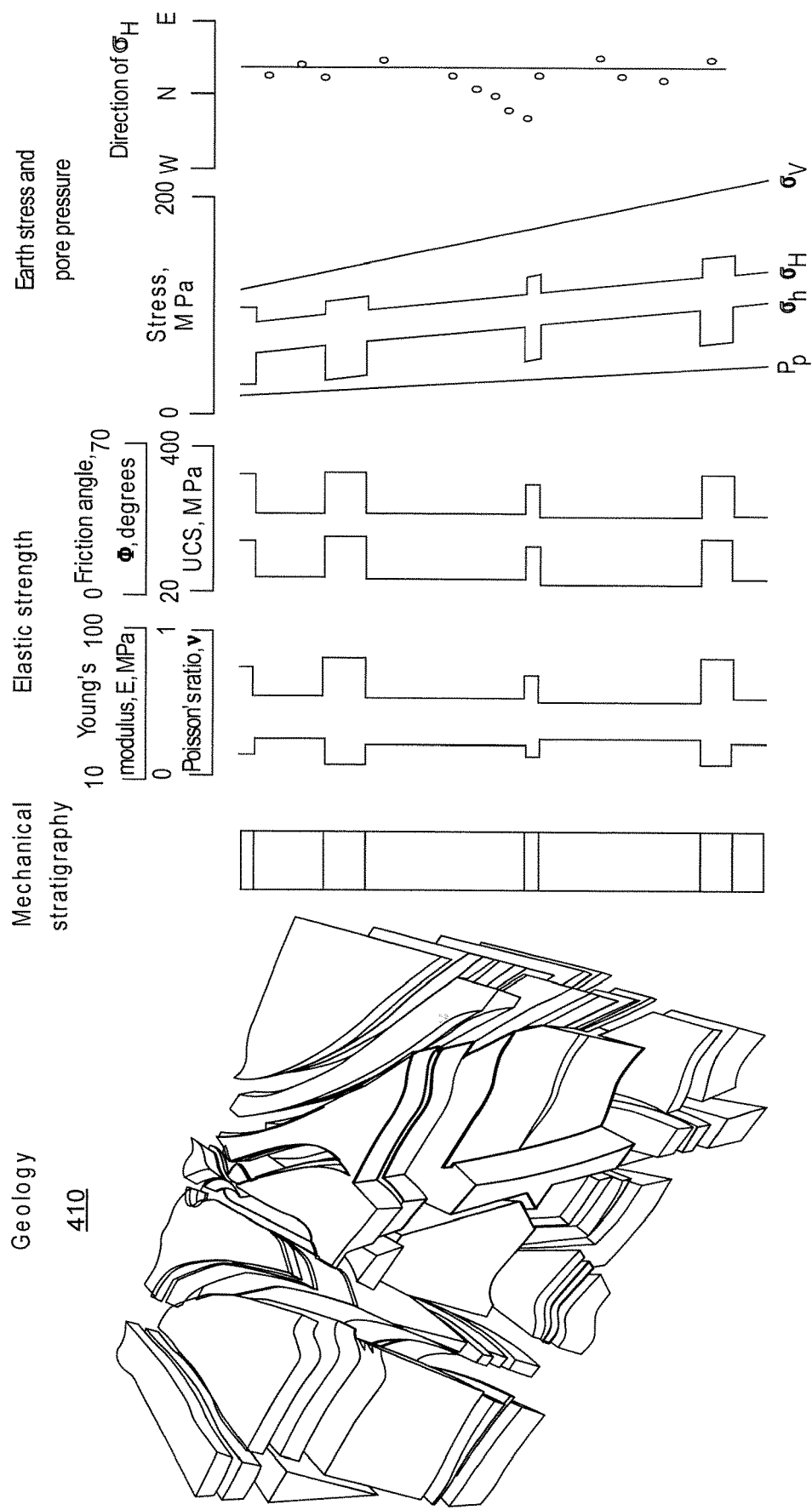
FIG. 4 illustrates an example of a model of a geologic environment and associated information.

FIG. 4 shows an example of a model 410 of a geologic environment. As shown, the model 410 is stratified where various types of information exist for the strata. For example, FIG. 4 shows information about facies types and local deformation mechanisms from which profiles of elastic and rock-strength parameters such as, for example, unconfined compressive strength (UCS) may be determined. Such parameters may be used, for example, to estimate pore pressure, minimum and maximum horizontal stresses and vertical stress.

The model 410 of FIG. 4 may be a mechanical earth model (MEM) suitable for use in a geomechanics simulation workflow. For example, the model 410 may be an expanded view of a finite element model suitable for use in the VISAGE® framework for performing geomechanical simulations.

As shown in FIG. 4, the model 410 can be of a region with defined sub-regions, which may be based on, for example, the presence of faults. For example, a fault may be identified via an interpretation workflow that processes seismic image data where the identified fault is utilized to define a boundary of a sub-region. In such an example, the identified fault may be a boundary between two or more sub-regions (e.g., depending on the region, nature of the fault, etc.). As may be appreciated from the information in FIG. 4, mechanical stratigraphy can differ between sub-regions. As such, proper identification of faults in a region can allow for a more accurate understanding of actual mechanical stratigraphy, which, in turn, can improve exploration and/or production operations. As an example, consider improvement of borehole stability via identification of a fault and/or improvement of fracturing via identification of a fault. As to borehole stability, a trajectory of a borehole may be drilled at a particular angle to the identified fault to generate a more stable borehole (e.g., to reduce risk of collapse). As to fracturing, a fracture may be generated via hydraulic fracturing that aims to avoid fluid communication with the identified fracture or that may aim to be in fluid communication with the identified fracture (e.g., depending on production scenario, injection as an enhanced recovery process, etc.).

Figure 5:
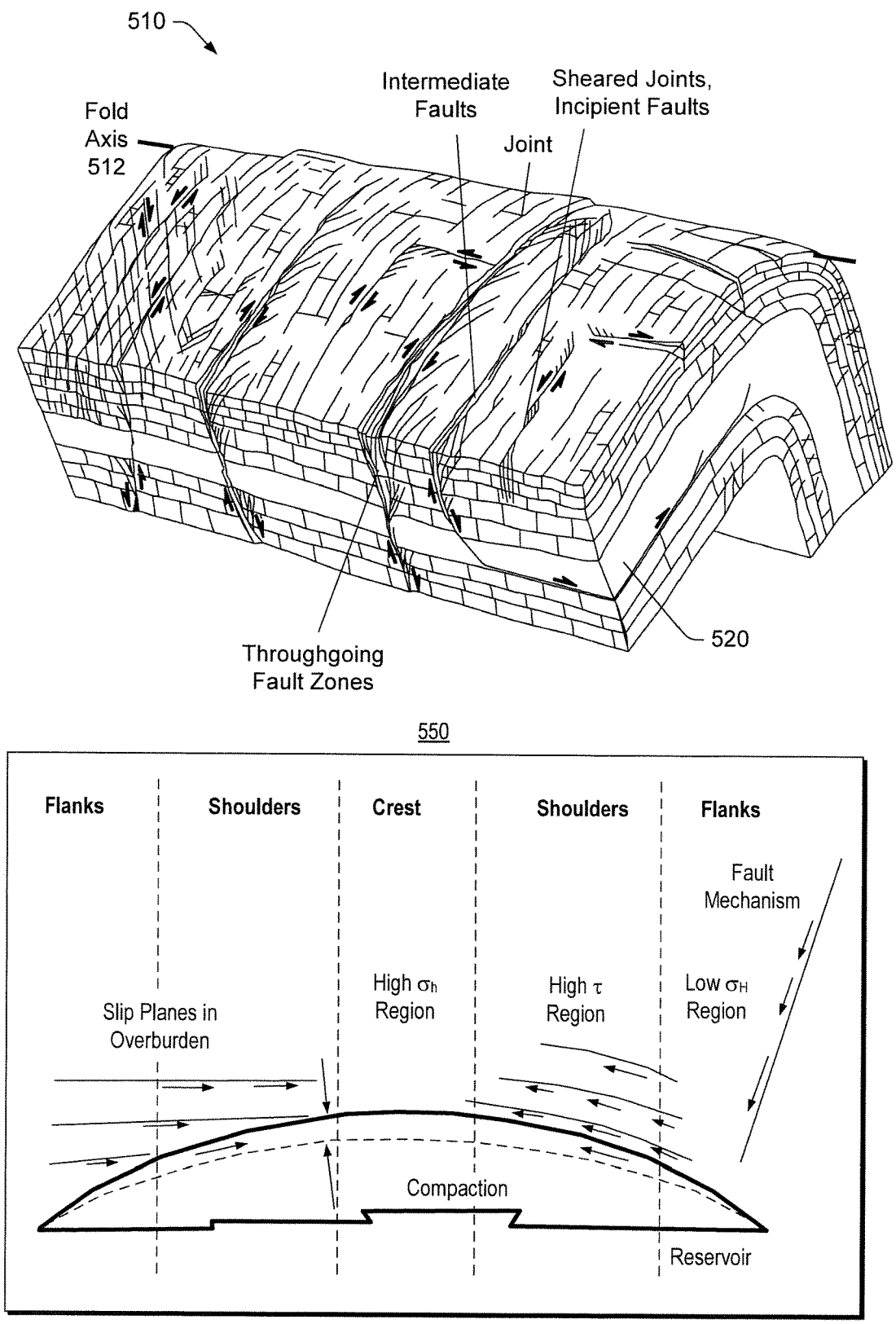
FIG. 5 illustrates examples of geologic environments.

FIG. 5 shows an example of a geologic environment 510 that includes folds, faults and fractures along an anticline 520. In folded rocks, faults and fractures may be oriented, for example, parallel or perpendicular to a fold axis. Fractures may form in response to stress, joints may form by means of tensile stresses and faults may form by means of shear stresses. Deformation over time may cause fractures to extend and, for example, change direction of motion along fracture planes. Faults and fractures may be stratabound and, for example, confined to a single layer or they may be or become throughgoing where they may cross sedimentary sequences and span one or more formations within a geologic environment. Connectivity may range from isolated individual fractures to widely spaced fracture swarms or corridors, which may be interconnected fracture networks.

As to exploration and development, vertical and/or deviated wells (e.g., horizontal wells, etc.) may be drilled into an environment. For example, substantially horizontal wells may be drilled parallel to a fold axis 512 as illustrated in the geologic environment 510 to increase the well's ability to intersect fractures. As an example, a method may include analyzing stability and/or instability of one or more bores in an environment that may include one or more of the features of the geologic environment 510.

FIG. 5 illustrates various examples of forces (see, e.g., arrows) that may be present in a geologic environment. As an example, production and/or injection of a reservoir or reservoirs in such an environment may alter forces, particularly over time as production and/or injection may occur and/or after production and/or injection may have occurred. Where one or more wells exist and/or are planned in such an environment, an understanding of survivability with respect to time may be beneficial.

FIG. 5 also shows an example of a region of a geologic environment 550. In the environment 550, fluid production and injection may alter a pressure field in a reservoir. Such processes may affect the state of stress and, for example, lead to deformation in the reservoir as well as surrounding rock. Such field changes can impact integrity of one or more existing and/or planned wells. Where a well fails, it may no longer fulfill its intended function or functions (e.g., access, isolation, production, injection, etc.). The environment 550 shows an example of a fault mechanism as impacting the right flank where a reservoir is present. In such an example, improved characterization of the fault can improve one or more operations that aim to produce fluid from the reservoir.

As mentioned, seismic image data may be acquired and analyzed to understand better subsurface structure of a geologic environment. Reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz or optionally less than about 1 Hz and/or optionally more than about 100 Hz). Seismic data may be processed and interpreted, for example, to understand better composition, fluid content, extent and geometry of subsurface rocks.

Figure 6:
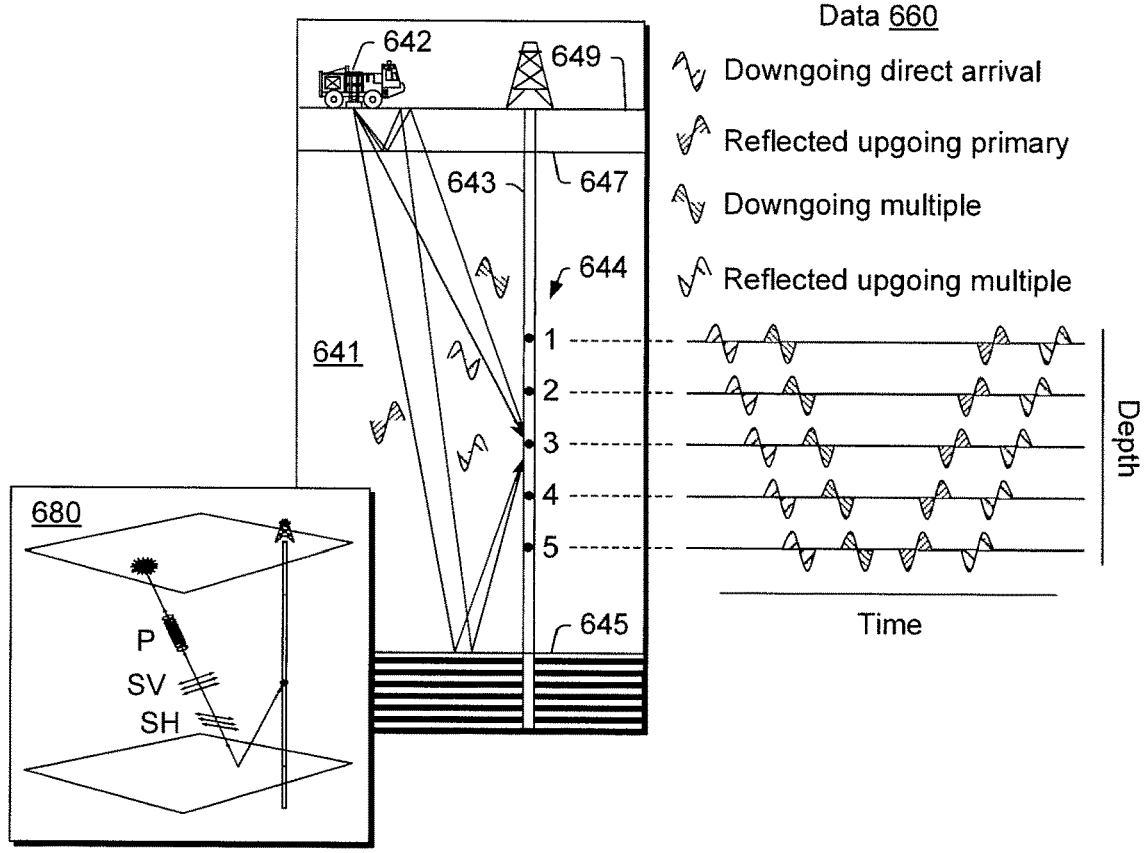
FIG. 6 illustrates examples of techniques and examples of data.
Figure 6:
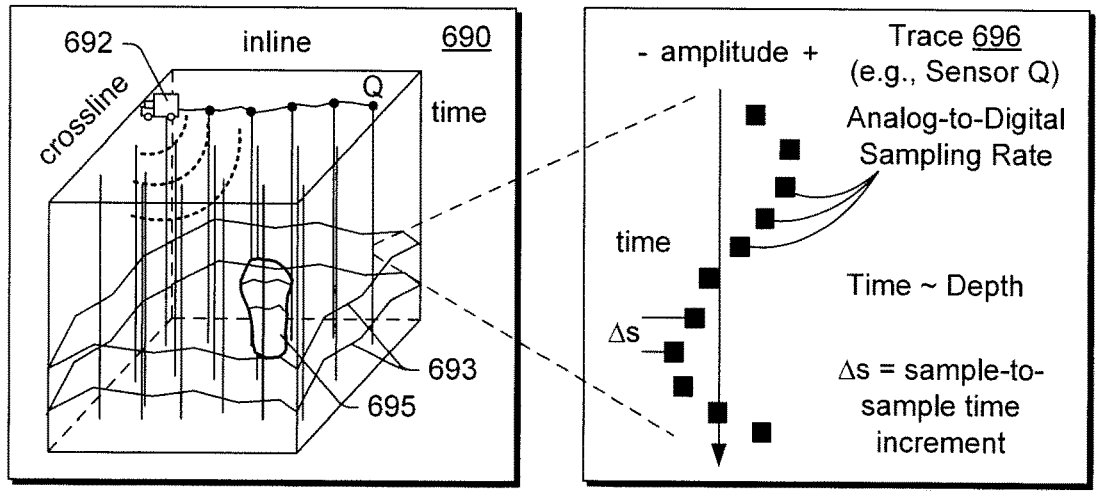

FIG. 6 shows an example of an acquisition technique 640 to acquire seismic image data (see, e.g., data 660). As an example, a system may process data acquired by the technique 640, for example, to allow for direct or indirect management of sensing, drilling, injecting, extracting, etc., with respect to a geologic environment. In turn, further information about the geologic environment may become available as feedback (e.g., optionally as input to the system). As an example, an operation may pertain to a reservoir that exists in a geologic environment such as, for example, a reservoir. As an example, a technique may provide information (e.g., as an output) that may specifies one or more location coordinates of a feature in a geologic environment, one or more characteristics of a feature in a geologic environment, etc.

In FIG. 6, the technique 640 may be implemented with respect to a geologic environment 641. As shown, an energy source (e.g., a transmitter) 642 may emit energy where the energy travels as waves that interact with the geologic environment 641. As an example, the geologic environment 641 may include a bore 643 where one or more sensors (e.g., receivers) 644 may be positioned in the bore 643. As an example, energy emitted by the energy source 642 may interact with a layer (e.g., a structure, an interface, etc.) 645 in the geologic environment 641 such that a portion of the energy is reflected, which may then be sensed by one or more of the sensors 644. Such energy may be reflected as an upgoing primary wave (e.g., or "primary" or "singly" reflected wave). As an example, a portion of emitted energy may be reflected by more than one structure in the geologic environment and referred to as a multiple reflected wave (e.g., or "multiple"). For example, the geologic environment 641 is shown as including a layer 647 that resides below a surface layer 649. Given such an environment and arrangement of the source 642 and the one or more sensors 644, energy may be sensed as being associated with particular types of waves.

As an example, seismic data may include evidence of an interbed multiple from bed interfaces, evidence of a multiple from a water interface (e.g., an interface of a base of water and rock or sediment beneath it) or evidence of a multiple from an air-water interface, etc.

As shown in FIG. 6, the acquired data 660 can include data associated with downgoing direct arrival waves, reflected upgoing primary waves, downgoing multiple reflected waves and reflected upgoing multiple reflected waves. The acquired data 660 is also shown along a time axis and a depth axis. As indicated, in a manner dependent at least in part on characteristics of media in the geologic environment 641, waves travel at velocities over distances such that relationships may exist between time and space. Thus, time information, as associated with sensed energy, may allow for understanding spatial relations of layers, interfaces, structures, etc. in a geologic environment.

FIG. 6 also shows a diagram 680 that illustrates various types of waves as including P, SV an SH waves. As an example, a P-wave may be an elastic body wave or sound wave in which particles oscillate in the direction the wave propagates. As an example, P-waves incident on an interface (e.g., at other than normal incidence, etc.) may produce reflected and transmitted S-waves (e.g., "converted" waves). As an example, an S-wave or shear wave may be an elastic body wave, for example, in which particles oscillate perpendicular to the direction in which the wave propagates. S-waves may be generated by a seismic energy sources (e.g., other than an air gun). As an example, S-waves may be converted to P-waves. S-waves tend to travel more slowly than P-waves and do not travel through fluids that do not support shear. In general, recording of S-waves involves use of one or more receivers operatively coupled to earth (e.g., capable of receiving shear forces with respect to time). As an example, interpretation of S-waves may allow for determination of rock properties such as fracture density and orientation, Poisson's ratio and rock type, for example, by crossplotting P-wave and S-wave velocities, and/or by other techniques.

As an example of parameters that can characterize anisotropy of media (e.g., seismic anisotropy, etc.), consider the Thomsen parameters $\epsilon$, $\delta$ and $\gamma$. The Thomsen parameter $\delta$ can describe offset effects (e.g., short offset). As to the Thomsen parameter $\epsilon$, it can describe offset effects (e.g., a long offset) and can relate to a difference between vertical and horizontal compressional waves (e.g., P or P-wave or quasi compressional wave qP or qP-wave). As to the Thomsen parameter $\gamma$, it can describe a shear wave effect. For example, consider an effect as to a horizontal shear wave with horizontal polarization to a vertical shear wave.

As an example, an inversion technique may be applied to generate a model that may include one or more parameters such as one or more of the Thomsen parameters. For example, one or more types of data may be received and used in solving an inverse problem that outputs a model (e.g., a reflectivity model, an impedance model, a fluid flow model, etc.). As an example, an inversion technique may be applied to generate and/or to refine a model. For example, the model of FIG. 4 may be based at least in part on an inversion that utilizes seismic image data. An inversion technique can include use of velocity model of a region where the velocity model may include layers where velocity in each layer of seismic energy depends at least in part on physical properties of material in a respective layer (e.g., rock, fluid, etc.).

As an example, a velocity model of a geologic region can include acoustic and/or elastic information (e.g., acoustic impedance and/or elastic impedance). Acoustic impedance is the product of density and seismic velocity, which varies among different rock layers, commonly symbolized by Z. The difference in acoustic impedance between rock layers affects the reflection coefficient. Elastic impedance is the product of the density of a medium and its shear wave velocity.

As an example, a process can include separating an acoustic model (compressional-wave) from an elastic model (including shear effects). In such an example, an inversion process can be conducted on two or three different stacked seismic volumes, each composed of traces that resulted from stacking a different range of offsets. The volume created from traces in the near-offset range (or a volume made by extrapolating amplitude variation with offset (AVO) behavior to zero offset at each sample) can be inverted to obtain an acoustic impedance volume. A volume created from traces in the far-offset range can be inverted to obtain an impedance volume called the elastic impedance (e.g., elastic impedance volume). In the AVO example, the elastic impedance volume includes effects of the compressional impedance and the AVO behavior resulting from the Vp/Vs ratio; the two volumes can be interpreted jointly to obtain the desired fluid or lithology indicator sought. As an example, converted-wave data can also be inverted for shear impedance. A model generated and/or refined via inversion can provide various insights as to a surveyed region's lithology, reservoir quality, fluids, etc.

In the example of FIG. 6, a diagram 690 shows acquisition equipment 692 emitting energy from a source (e.g., a transmitter) and receiving reflected energy via one or more sensors (e.g., receivers) strung along an inline direction. As the region includes layers 693 and, for example, the geobody 695, energy emitted by a transmitter of the acquisition equipment 692 can reflect off the layers 693 and the geobody 695. Evidence of such reflections may be found in the acquired traces. As to the portion of a trace 696, energy received may be discretized by an analog-to-digital converter that operates at a sampling rate. For example, the acquisition equipment 692 may convert energy signals sensed by sensor Q to digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

A 4D seismic survey involves acquisition of 3D seismic data at different times over a particular area. Such an approach can allow for assessing changes in a producing hydrocarbon reservoir with respect to time. As an example, changes may be observed in one or more of fluid location and saturation, pressure and temperature. 4D seismic data can be considered to be a form of time-lapse seismic data.

As an example, a seismic survey and/or other data acquisition may be for onshore and/or offshore geologic environments. As to offshore, streamers, seabed cables, nodes and/or other equipment may be utilized. As an example, nodes can be utilized as an alternative and/or in addition to seabed cables, which have been installed in several fields to acquire 4D seismic data. Nodes can be deployed to acquire seismic data (e.g., 4D seismic data) and can be retrievable after acquisition of the seismic data. As an example, a 4D seismic survey may call for one or more processes aimed at repeatability of data. A 4D survey can include two phases: a baseline survey phase and a monitor survey phase.

As an example, seismic data may be processed in a technique called "depth imaging" to form an image (e.g., a depth image) of reflection amplitudes in a depth domain for a particular target structure (e.g., a geologic subsurface region of interest).

Information from one or more interpretations can be utilized in one or more manners with a system that may be a well construction ecosystem. For example, seismic data may be acquired and interpreted and utilized for generating one or more models (e.g., earth models) for purposes of construction and/or operation of one or more wells.

Figure 7:
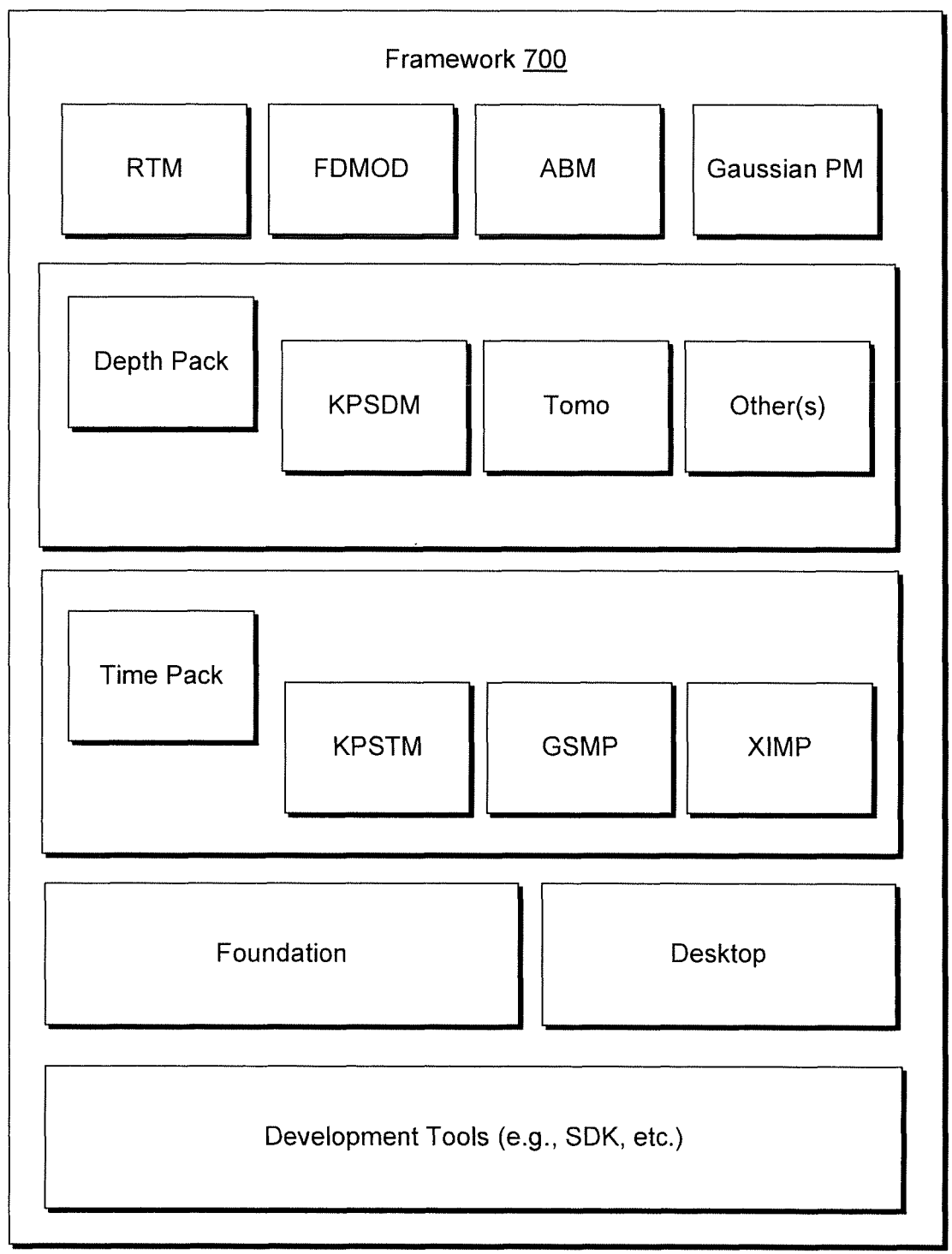
FIG. 7 illustrates an example of a framework.

FIG. 7 shows an example of a computational framework 700 that can include one or more processors and memory, as well as, for example, one or more interfaces. The computational framework of FIG. 7 can include one or more features of the OMEGA® framework (Schlumberger Limited, Houston, Tex.), which includes finite difference modelling (FDMOD) features for two-way wavefield extrapolation modelling, generating synthetic shot gathers with and without multiples. The FDMOD features can generate synthetic shot gathers by using full 3D, two-way wavefield extrapolation modelling, which can utilize wavefield extrapolation logic matches that are used by reverse-time migration (RTM). A model may be specified on a dense 3D grid as velocity and optionally as anisotropy, dip, and variable density.

As shown in FIG. 7, the computational framework 700 includes features for RTM, FDMOD, adaptive beam migration (ABM), Gaussian packet migration (Gaussian PM), depth processing (e.g., Kirchhoff prestack depth migration (KPSDM), tomography (Tomo)), time processing (e.g., Kirchhoff prestack time migration (KPS™), general surface multiple prediction (GSMP), extended interbed multiple prediction (XIMP)), framework foundation features, desktop features (e.g., GUIs, etc.), and development tools.

The framework 700 can include features for geophysics data processing. The framework 700 can allow for processing various types of data such as, for example, one or more of: land, marine, and transition zone data; time and depth data; 2D, 3D, and 4D surveys; isotropic and anisotropic (TTI and VTI) velocity fields; and multicomponent data.

The framework 700 can allow for transforming seismic, electromagnetic, microseismic, and/or vertical seismic profile (VSP) data into actionable information, for example, to perform one or more actions in the field for purposes of resource production, etc. The framework 700 can extend workflows into reservoir characterization and earth modelling. For example, the framework 700 can extend geophysics data processing into reservoir modelling by integrating with the PETREL® framework via the Earth Model Building (EMB) tools, which enable a variety of depth imaging workflows, including model building, editing and updating, depth-tomography QC, residual moveout analysis, and volumetric common-image-point (CIP) pick QC. Such functionalities, in conjunction with the framework's depth tomography and migration algorithms, can produce accurate and precise images of the subsurface. The framework 700 may provide support for field to final imaging, to prestack seismic interpretation and quantitative interpretation, from exploration to development.

As an example, the FDMOD component can be instantiated via one or more CPUs and/or one or more GPUs for one or more purposes. For example, consider utilizing the FDMOD for generating synthetic shot gathers by using full 3D, two-way wavefield extrapolation modelling, the same wavefield extrapolation logic matches that are used by reverse-time migration (RTM). FDMOD can model various aspects and effects of wave propagation. The output from FDMOD can be or include synthetic shot gathers including direct arrivals, primaries, surface multiples, and interbed multiples. The model can be specified on a dense 3D grid as velocity and optionally as anisotropy, dip, and variable density. As an example, survey designs can be modelled to ensure quality of a seismic survey, which may account for structural complexity of the model. Such an approach can enable evaluation of how well a target zone will be illuminated. Such an approach may be part of a quality control process (e.g., task) as part of a seismic workflow. As an example, a FDMOD approach may be specified as to size, which may be model size (e.g., a grid cell model size). Such a parameter can be utilized in determining resources to be allocated to perform a FDMOD related processing task. For example, a relationship between model size and CPUs, GPUs, etc., may be established for purposes of generating results in a desired amount of time, which may be part of a plan (e.g., a schedule) for a seismic interpretation workflow.

As an example, as survey data become available, interpretation tasks may be performed for building, adjusting, etc., one or more models of a geologic environment. For example, consider a vessel that transmits a portion of acquired data while at sea and that transmits a portion of acquired data while in port, which may include physically offloading one or more storage devices and transporting such one or more storage devices to an onshore site that includes equipment operatively coupled to one or more networks (e.g., cable, etc.). As data are available, options exist for tasks to be performed.

Figure 8:
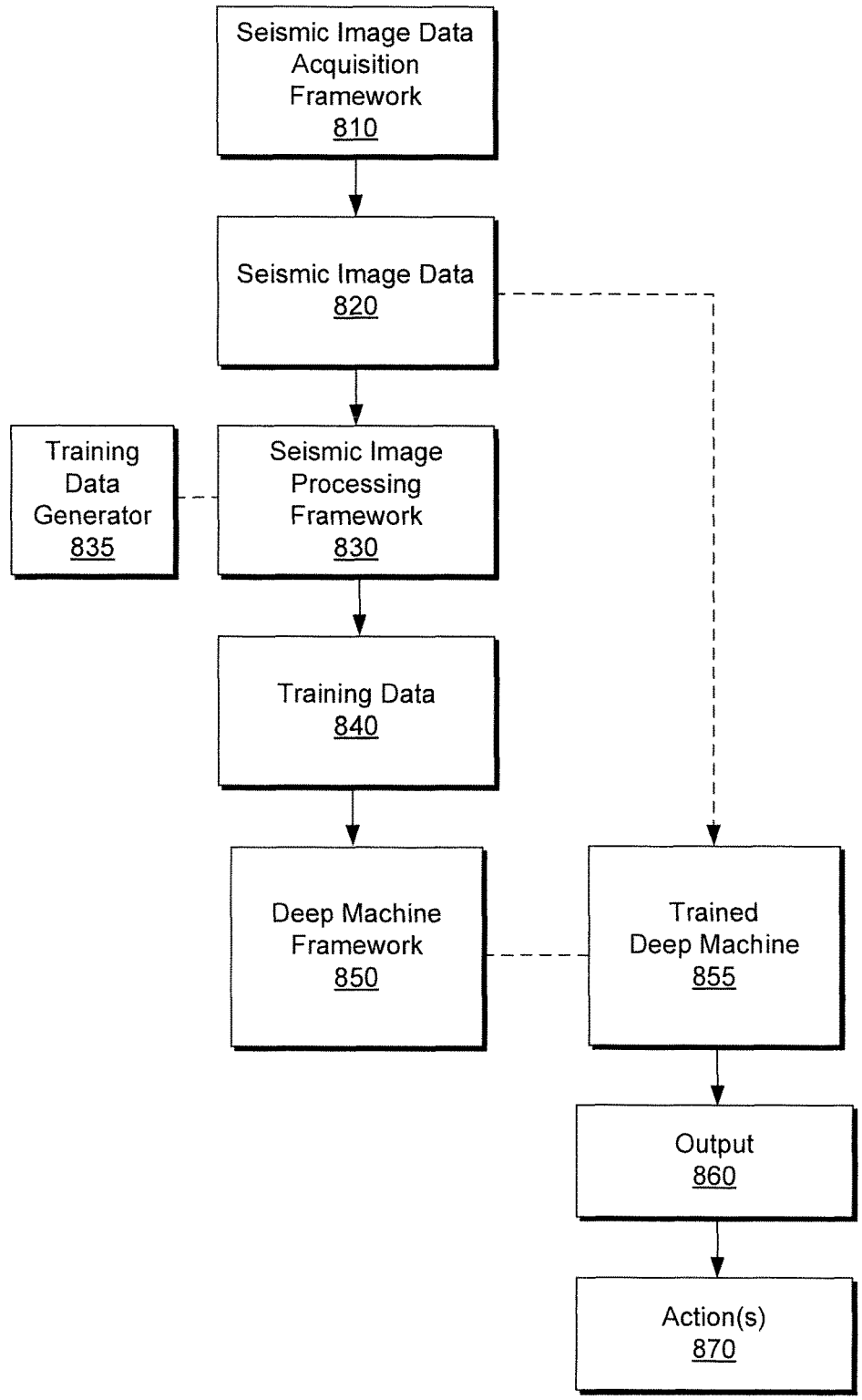
FIG. 8 illustrates an example of a system.

FIG. 8 shows an example of a system 800 that includes a seismic image data acquisition framework 810 that can output seismic image data 820, a seismic image processing framework 830 that includes a training data generator component 835 that can output training data 840, and a deep machine framework 850 that can output a trained deep machine 855 that can process seismic image data such as that generated by the seismic image data acquisition framework 810 to generate output 860 where such output can be utilized to perform one or more actions 870 of a workflow (e.g., planning, control, etc.).

Figure 10:
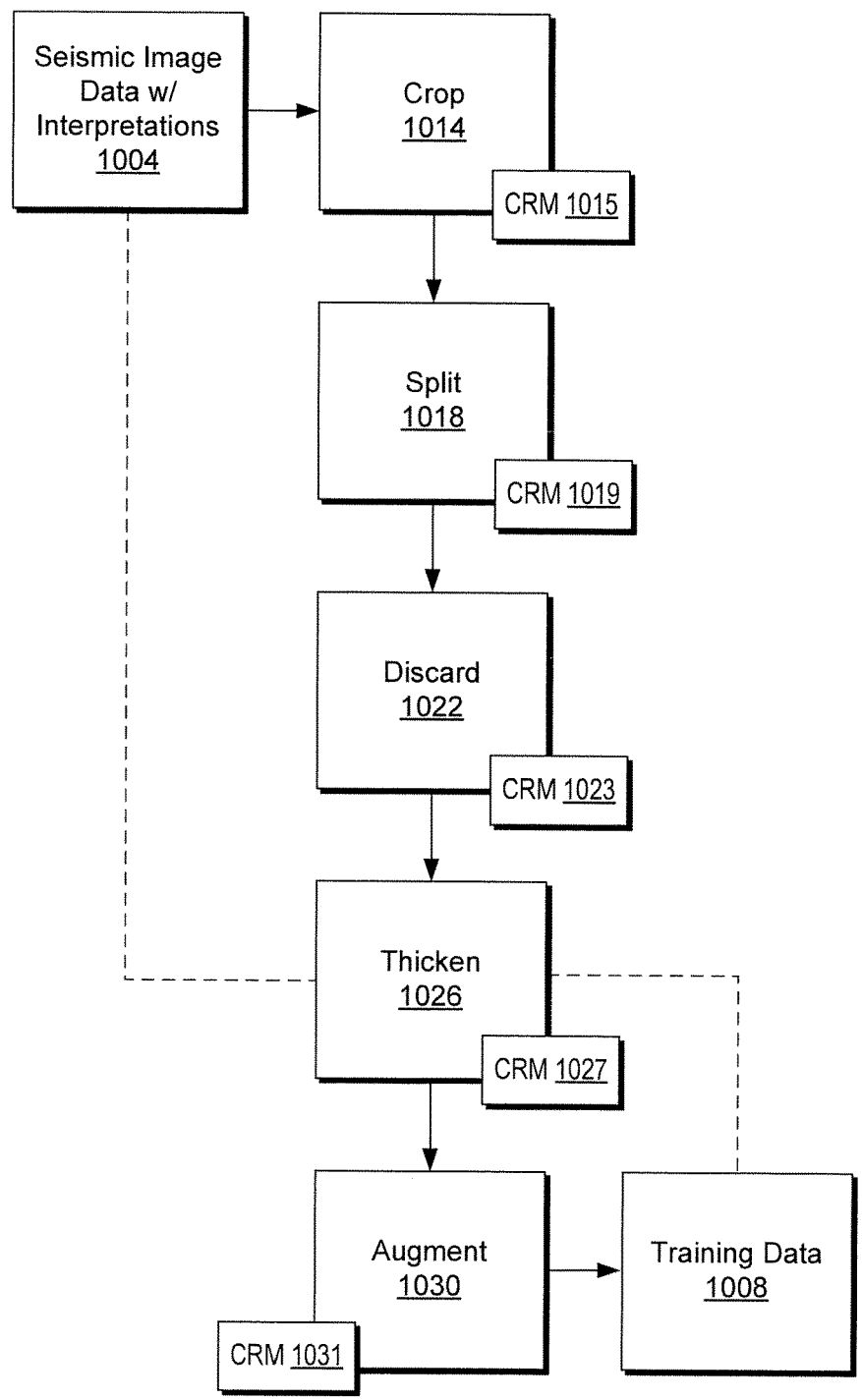
FIG. 10 illustrates an example of a method.

In the example of FIG. 8, the training data generator 835 can include one or more components such as, for example, one or more of the blocks of the method 1010 of FIG. 10 where the training data 1008 can be or include the training data 840 of FIG. 8.

The training data generator 835 can be implemented to improve the trained deep machine 855, which may be a trained deep neural network (DNN) as utilized in machine learning systems. For example, the training data generator 835 can generate the training data 840 where the training data 840 can enhance learning of a deep machine via deep machine learning (e.g., deep learning).

The training data generator 835 can be implemented to address, for example, imbalance in training data. For example, the seismic image data 820 can be imbalanced as it can be predominantly representative of layers of material that can be relatively homogeneous and laterally extensive without interruption where it is less representative of features such as faults that can interrupt such laterally extensive layers. As mentioned, knowledge of faults can be helpful when exploring an oil and/or gas field, developing an oil and/or gas field, producing fluid from an oil and/or gas field, etc. Where the imbalance of training data can be shifted towards a desired class or category of feature to be discerned via a trained deep machine (e.g., and away from an undesired class or category), the training data generator 835 can be implemented to utilize one or more approached to achieve such a shift. Further, the training data generator 835 can generate additional training data, for example, via augmentation, which may be achieved in a manner that reduces the effect of one or more biases that can exist in the seismic image data 820 (e.g., acquisition geometry artefacts, interpreter bias, geologic region feature orientation bias, etc.).

As an example, a method can include receiving seismic image data of a geologic region and interpretation information of the seismic image data for a geologic feature in the geologic region, where the seismic image data include a geologic feature class imbalance; shifting the geologic feature class imbalance toward a class of the geologic feature by increasing the spatial presence of the geologic feature in the seismic image data to generate training data; and training a neural network using the training data to generate a trained neural network. As an example, such a method may be performed at least in part via one or more components of the system 800. For example, the training data can be the training data 840 as generated by the seismic image processing framework 830 and the training data generator 835 and, for example, the training of the neural network can be via the deep machine framework 850 to generate the trained deep machine 855 as the trained neural network.

As an example, the deep machine framework 850 can include one or more features of the TENSORFLOW framework (Google, Mountain View, Calif.) framework, which includes a software library for dataflow programming that provides for symbolic mathematics, which may be utilized for machine learning applications such as artificial neural networks (ANNs), etc.

As an example, the deep machine framework 850 can include one or more features of the CAFFE framework, which includes models and optimization defined by configuration where switching between CPU and GPU setting can be achieved via a single flag to train on a GPU machine then deploy to clusters. An implementation of CAFFE framework can process over 60M images in 24 hours with a single NVIDIA® K40 GPU, which equates to approximately 1 ms/image for inference and 4 ms/image for learning. The NVIDIA® K40 GPU includes over 2,000 processor cores.

Manual seismic interpretation involves rendering a seismic image to a display and a process referred to as picking, which can be facilitate through use of a cursor navigable by a mouse, a trackball, etc., through use of a stylus, through use of a finger (e.g., on a touchscreen, a touchpad, etc.), etc. The term pick can be defined as interpreting data such as seismic sections by selecting and tracking marker beds or other events. Selecting can occur by positioning a cursor on a rendered seismic image at a particular location that is interpreted to be a point of interest (e.g., a seismic event, etc.). A user may select the point via a mouse click or another type of action or instruction (e.g., a keystroke, a depression of a stylus tip, a click of a stylus button, etc.). Once selected, information concerning the point can be saved to a storage device (e.g., a memory device operatively coupled to a computing device or system). Such information can include coordinates of the point, which may be a pixel or a voxel of a seismic image dataset, which can include associated seismic information (e.g., coordinates, amplitude, time, etc.). As an example, a series of selections can be associated with a particular structural feature of a subsurface region. Thus, for example, interpretation of a fault via picking can generate a series of points that are believed to be associated with the fault, if it is indeed a fault (e.g., and not a misinterpreted feature).

A pick can be defined as a feature interpreted or otherwise selected from data, such as a seismic event. As an example, a workflow can include picking as to seismic data or other data or a combination of seismic data and other data. For example, a workflow can include correlation of seismic picks to geologic picks, such as formation tops interpreted from well logs, which may help to improve interpretations.

As may be appreciated, manual interpretation demands considerable manual effort and judgment on the part of the individual performing the interpretation. Different individuals, as based on individual judgment, may provide results with minor differences in interpretation or with differences that may give rise to one or more downstream issues. While differences between skilled individuals tend to be generally acceptable for making decisions and understanding the subsurface, they can create a challenge when the results are being used as training sets for deep learning as in various machine learning methods. As an example, inconsistencies may inhibit machine learning and produce poor prediction results from a trained machine.

Artificial neural networks (ANNs) can be constructed according to an architecture that includes nodes or neurons and may include layers and/or other features. ANNs include interconnections between various neurons and can include discrete layers, connections, and directions of data propagation.

As an example, an ANN can take an image, break the image into tiles, and input the tiles to a first layer of the ANN where, in the first layer, individual neurons can pass the data to a second layer. In such an example, the second layer of neurons can perform one or more tasks and pass along information to a next layer, which may be another intermediate layer or a final layer, where a result or results are output.

In an ANN, each neuron can assign a weighting to its input, for example, an indication as to how "true" or "false" it is relative to the task being performed. The final output can be determined by a total of those weightings. As an example, consider attributes of a stop sign image being tiled and processed by neurons, which may consider features such as octagonal shape, color, distinctive letters, traffic-sign size, etc. The ANN's task can be to conclude whether the input image is a stop sign or not. The ANN can generate a probability vector that is based on weightings. For example, the output from an ANN might be a confidence number or confidence numbers, where possible other outcomes exist (e.g., 86 percent confident the image is of a stop sign, 7 percent confident the image is of a speed limit sign, and 5 percent confident that the image is not of a sign).

In the foregoing example, if the ANN fails to output high confidence percentages to images of stop signs, the ANN may be lacking in its training. In other words, if the ANN was trained using poor quality images and/or poor labelling of features in those images, then the ANN may be expected to perform poorly when implemented for purposes of image recognition such as in a vehicle's camera-based street sign recognition system (e.g., consider an Advanced Driver-Assistance System or ADAS).

Training of an ANN can be a complex process, particularly as to accessing appropriate training data. For example, in the stop sign example, an ANN may demand hundreds of thousands or even millions of images until the weightings of the neuron inputs are tuned precisely such that a "trained" ANN is generated. In the foregoing example, a properly trained ANN "knows", through appropriate training, what a stop sign looks like.

As the number of neurons and layers increase, an ANN may be referred to as a "deep" ANN, which demands deep learning. Deep learning can be defined as, for example, a class of machine learning algorithms that: (a) use a cascade of multiple layers of nonlinear processing units for feature extraction and transformation where each successive layer uses the output from the previous layer as input; (b) learn in supervised (e.g., classification) and/or unsupervised (e.g., pattern analysis) manners; and (c) learn multiple levels of representations that correspond to different levels of abstraction where the levels form a hierarchy of concepts.

As an example, a deep neural network (DNN) can be a feedforward network in which data flows from an input layer to an output layer without looping back. A DNN may create a map of virtual neurons and assign random numerical values, or weights, to connections between them. The weights and inputs can be multiplied and return an output, for example, between 0 and 1. Where the DNN does not accurately recognize a particular pattern during training, an algorithm can be implemented to adjust one or more weights. In such a manner, the algorithm can make certain parameters more influential and similarly others less influential.

As an example, a computational system can include graphics processing units (GPUs), which can be utilized to perform matrix and/or vector operations involved in machine learning such as deep learning.

In the foregoing example pertaining to stop signs, it can be relatively inexpensive to generate a training dataset. For example, a person can go by foot, bike or car about a neighborhood and photograph stop signs where the person may photograph each stop sign from a different angle, with different lighting, with different environmental factors (e.g., summer, fall, spring, winter, rain, snow, etc.). In such photographs, an ordinary observer could reliably determine that each photograph includes a stop sign, which may be appropriately coded (e.g., labelled) to form a training set for machine learning.

In contrast to stop signs, with respect to subsurface structural features of the Earth, seismic images are expensive to obtain and experts are used to determine whether a seismic image includes one or more faults. As such, training data is relatively scarce. As deep learning demands a substantial amount of training data, use of DNNs for automated identification of faults faces some impediments.

Data sets with imbalanced class distributions often occur in real applications; for example, in credit card fraud detection, legitimate transactions outnumber fraudulent transactions. Similarly, when detecting defects in a factory setting, defective products are expected to be a small amount of the total output.

As an example, a method can provide an approach to reduce classification imbalance in training data for machine learning based on automatic seismic interpretation and to account for the variation in interpretation object placement by human interpreters.

As an example, a method can provide an approach to deliver relatively consistent and balanced training data for machine learning to help automatic seismic interpretation machine learning models to produce interpretations which are more accurate and that encompass the interpretation locations which would be picked by human interpreters.

In various example embodiments, methods, computing systems, and/or computer-readable media can provide datasets for seismic interpretations. As an example, an approach can be implemented that takes as input the seismic cubes and seismic interpretations (e.g., such as fault sticks, horizon interpretations, salt body boundaries, geobodies, etc.) from human experts on the cubes. The approach may then generate data that can be used for training automatic seismic interpretation models such that the models can provide improved predictions.

As an example, an approach to generating training data can involve: receiving a seismic cube with interpretations; cropping the seismic sections to those parts that include seismic interpretations; splitting the sections into smaller tiles; discarding one or more seismic sections that do not include an interpretation; thickening the interpretations; and augmenting the training data, for example, by mirroring the training data by flipping on the vertical axis.

Learning from imbalanced data is a challenge that exists in the realm of machine learning. One approach to such learning involves pre-processing the training data before the learning takes place. Pre-processing strategies may include methods of using the available training data in a way that is expected to provide predictions that more accurately match user preferences. In such an approach, rather than training the learning algorithm directly on the training data, the training data may first be modified according to the user's goals. After pre-processing, the learning algorithm can be applied to the data.

Data pre-processing strategies include, for example, input data weighting, re-sampling, and active learning. In input data weighting, the training data distribution is modified using misclassification information cost so that the learned model tends to reduce expensive errors. In re-sampling, the distribution of the training data is changed, thereby promoting the significance of the least-represented examples. In active learning, the most valuable samples to learn from are selected, avoiding the ones with less information, with the aim of improving performance of the learned model.

With re-sampling methods, several existing techniques can be used. Some examples include under-sampling the majority data, over-sampling the minority data, synthesizing the new data, and evolutionary sampling.

When interpreting seismic image data, a large class imbalance often exists. For example, when performing pixel segmentation for fault interpretation, the potential categories are "fault" and "not fault."

Figure 9:
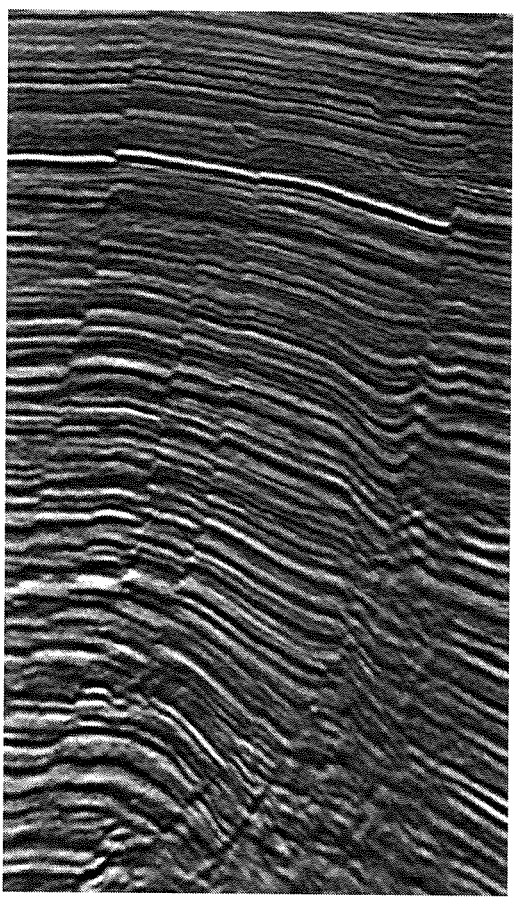
FIG. 9 illustrates example images.
Figure 9:
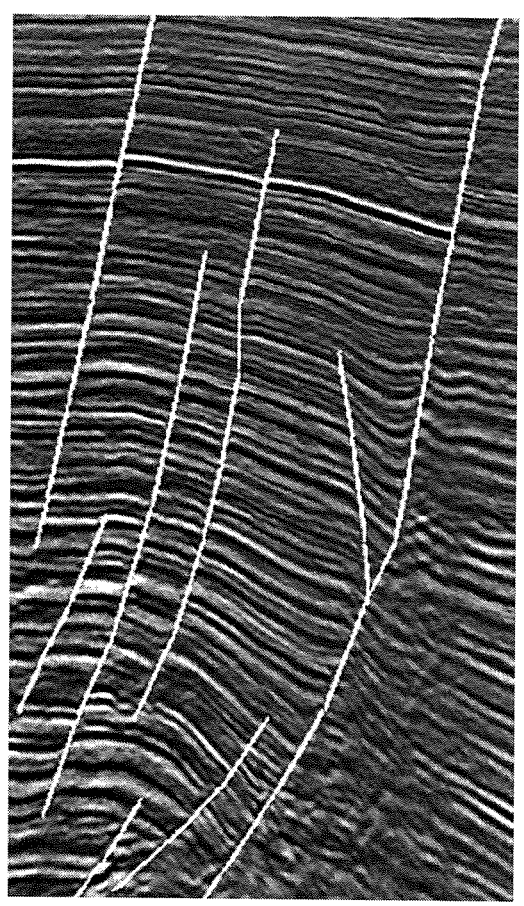

FIG. 9 shows an example of a seismic image where a raw training image 910 is shown on the left while the image on the right 930 has been pre-processed as to pixel classification of the seismic section where black pixels correspond to "not fault" and white pixels correspond to "fault". As to imbalance in the seismic image, note that the "not fault" category is often over 99 percent of the pixels. Accordingly, seismic image data can be scarce and imbalanced, which can present challenges in training a DNN.

FIG. 10 shows an example of a method 1010 that can receive seismic image data with interpretations 1004 as input and that can generate training data 1008 as output. The seismic image data with interpretations 1004 can be in the form of multidimensional seismic data with information generated via interpretation via manual and/or automated interpretation.

As an example, the method 1010 may be performed iteratively and/or in parallel for a plurality of seismic slices such as slices or sections of a seismic cube. For example, input can be one or more seismic cubes that include interpretation information where the method 1010 can process through iterating through seismic sections (e.g., inlines, crosslines, random lines) of the data to generate output. As an example, a plurality of computational threads can be established for processing input in parallel. In such an example, each thread may process a particular seismic section of a plurality of seismic sections. As an example, a thread may be established via a processor or processors, which may include one or more GPUs.

As shown in the example of FIG. 10, the method 1010 includes a crop block 1014 for cropping input to generated a cropped image, a split block 1018 for splitting a cropped image into portions, a discard block 1022 for discarding one or more of the portions (e.g., based on one or more criteria), a thicken block 1026 for thickening a width of one or more interpreted features in a non-discarded portion to generate a portion with a thickened feature, and an augmentation block 1030 for augmenting the portion with the thickened feature, which can be output as the training data 1008.

As an example, the crop block 1014 can include cropping a seismic section to a part or parts that include seismic interpretation and the split block 1018 can include splitting the part or parts into smaller tiles. As an example, the discard block 1022 can involve discarding a tile or tiles that do not include seismic interpretation and, for those that do, the thicken block 1026 can include thickening the seismic interpretation. As shown in the example of FIG. 10, the method 1010 can include the augment block 1030 for augmenting the training data; for example, consider an approach that involves mirroring the training data by flipping it on an axis to generate the output. As an example, the augment block 1030 may be optionally implemented as the training data 1008 can be from the thicken block 1026 without augmentation. As an example, the training data 1008 can include training data output from the thicken block 1026 and training data output from the augment block 1030.

The method of FIG. 10 is shown along with various computer-readable storage medium or media (CRM) blocks 1015, 1019, 1023, 1027 and 1031. Such blocks can include processor-executable instructions, for example, as one or more sets of instructions such as the one or more sets of instructions of the block 270 of the system 250 of FIG. 2. A computer-readable storage medium is non-transitory, not a signal and not a carrier wave. A CRM can be a drive that can store information in digital form and that can be accessed via one or more interfaces, for example, to provide information to a processor, which may be a CPU, a core, a GPU, etc.

As an example, a method can include cropping seismic sections to those parts that include seismic interpretation (e.g., information as to one or more points, whether manually picked, semi-automatically interpreted or automatically interpreted). In such an example, this cropping action may under-sample the majority class or category (e.g., no interpretation) and help to diminish imbalance from the data. As an example, such a cropping action may be performed as part of input data quality control. As an example, if a data set does not include a seismic interpretation that covers an entire surveyed region, a method can include removing one or more areas where faults exist but an interpretation (e.g., the interpreter) indicates that they do not. As an example, such a process may be performed in an automated manner.

As an example, a method can include splitting two-dimensional seismic sections into smaller 2D tiles. Various machine learning models may work better when training with small tiles that are of the same size. Using smaller tiles may also facilitate action of a discard block (see, e.g., the block 1022). When training data comes from multiple sources (e.g., multiple surveys, etc.), it may not be reasonable to assume that the chosen tile size divides evenly into the provided section size.

Figure 11:
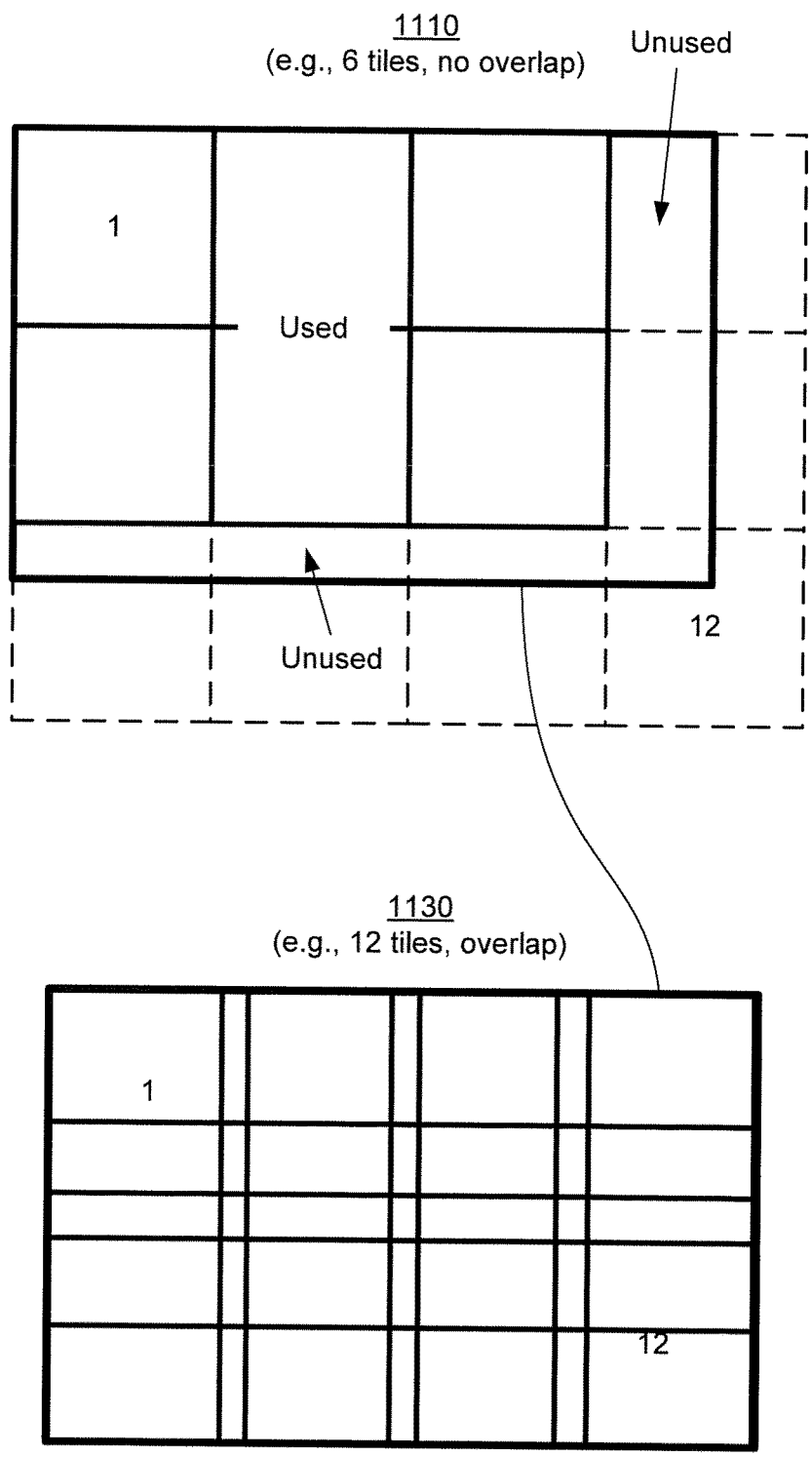
FIG. 11 illustrates examples of tiling.

FIG. 11 shows examples of graphics with respect to images 1110 and 1130 to illustrate approaches to tiling with tiles. In the example 1110, a no overlap approach results in unused parts of an image (e.g., a seismic section, etc.); whereas, in the example 1130, overlap can be implemented to utilize the entire image. As an example, a combination of no overlap and overlap may be implemented, optionally depending on information such as interpretation information (e.g., seismic interpretation).

As shown in the example image 1130, a method can include determining a tile size such that tiles are sampled with just enough overlap to make them line up with the section.

As mentioned, a method can include discarding information. For example, a method can include discarding one or more tiles that do not include seismic interpretation such that the discarded one or more tiles do not contribute to the training data. Such an approach may be implemented to act as an under-sampling strategy whereby the majority class or category is under-sampled to help remove imbalance from the data (e.g., under-sampling of no seismic interpretation).

As mentioned, a method can include thickening. As an example, thickening can involve overgrowing a boundary or boundaries of one or more structures for seismic interpretation. As an example, an amount of thickening may be specified on a per interpretation basis.

As an example, a method can include thickening that is performed by a convolution over an image of the seismic interpretation of the slice (e.g., seismic section) followed by rounding. Thickening may help ensure that the predictions created by the trained models are also thickened. Such an approach may help account for minor variations in interpretation, which can exist in human interpretation, and may help to ensure that the predictions match the expectations of human interpreters. As an example, thickening may also oversample the one or more minority classes or categories, which may help to further improve classification balance (e.g., reduce imbalance).

As an example, a method can include cropping a seismic image data cube (e.g., manually and/or automatically via machine automation) into sections, splitting sections into smaller tiles (see, e.g., FIG. 11), discarding tiles (e.g., rather than entire sections) that do not include a desired geologic feature (e.g., discarding tiles without identified fault or faults), and, for example, mirroring at least some of the tiles to generate augmented training data, which may be used in addition to the un-mirrored training data resulting from the foregoing process of cropping, splitting and discarding. Such a method can help to reduce class imbalance and/or bias in seismic image data for purposes of training one or more machine models.

Figure 12:
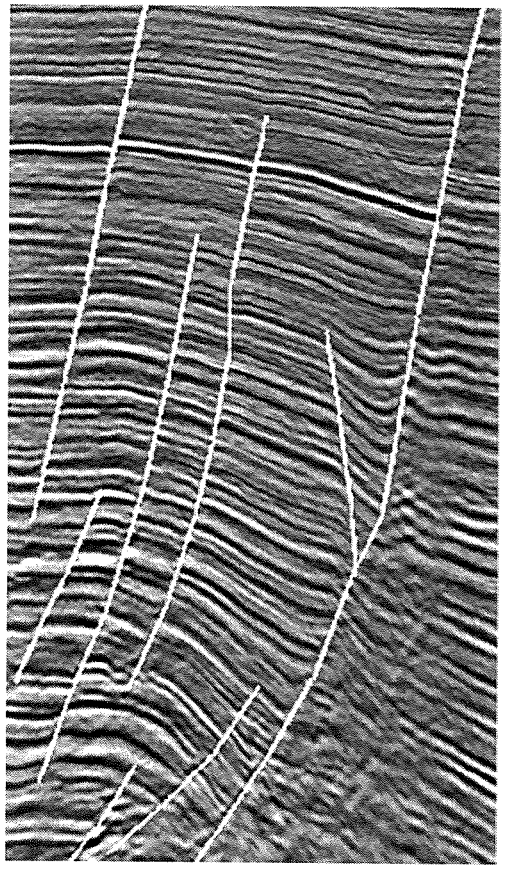
FIG. 12 illustrates examples of thickening.
Figure 12:
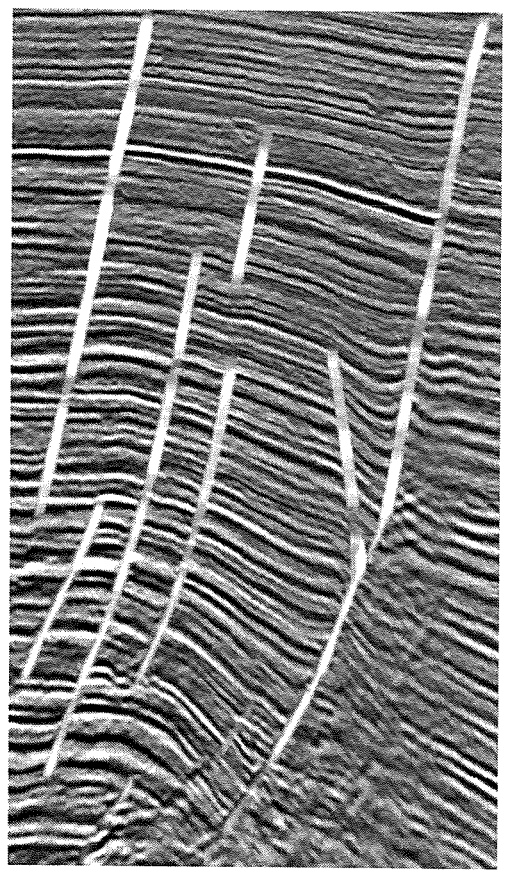

FIG. 12 shows an example image 1210 with seismic interpretation information and an example image 1230 that has been subjected to thickening of features from seismic interpretation. In particular, the images 1210 and 1230 show examples of faults where the faults can be represented by pixels of a pixel image where more pixels represent the faults in the image 1230 than in the image 1210. In such an example, the number of pixels in the minority class or category "fault" are increased while the number of pixels in the majority class or category "no fault" are decreased. As such, the approach of thickening can help to reduce imbalance (e.g., create more balance) in training data that can be utilized in machine learning. As an example, thickening can help to cope with interpretation discrepancy.

As mentioned, a method can include mirroring, for example, as an augmentation process. A mirror block can be implemented to act as a form of data augmentation and/or de-biasing. Mirroring trained data may also double the amount of training data available.

As explained, seismic interpretation can occur using a cursor and a mouse or other pointing device that can instruct a computing device or system to move the cursor as rendered to a display. A bias may exist for one or more reasons, which may be a training data bias and/or an interpreter bias. For example, as to training data bias, a region of the Earth that has been imaged can include faults that are sloped in a particular direction and no or fewer faults slope in other directions. As to interpreter bias, for example, a right-handed interpreter may have a tendency to move a cursor differently depending on slope of a feature in an image than a left-handed interpreter. Bias may exist due to vision, posture, etc. For one or more reasons, seismic interpretations may have a direction bias (such as faults which can have a left to right incline and/or a picking bias due to particularities of an interpreter).

Figure 13:
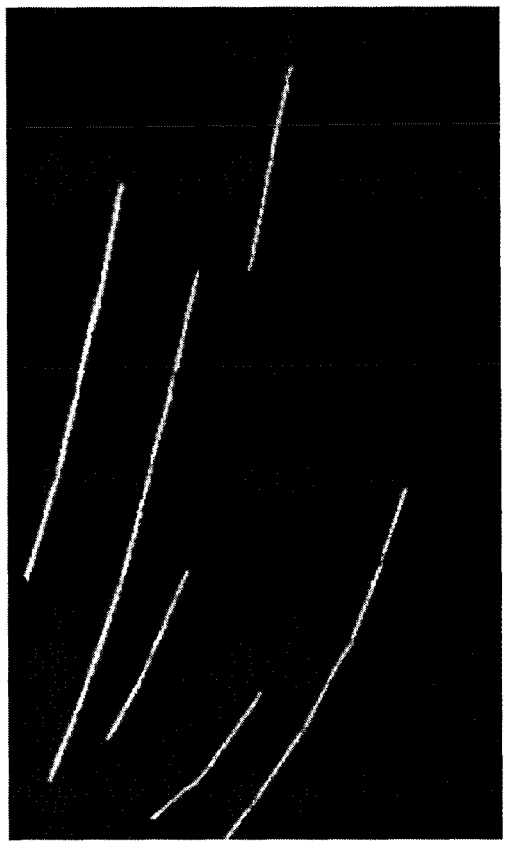
FIG. 13 illustrates an example of augmentation.
Figure 13:
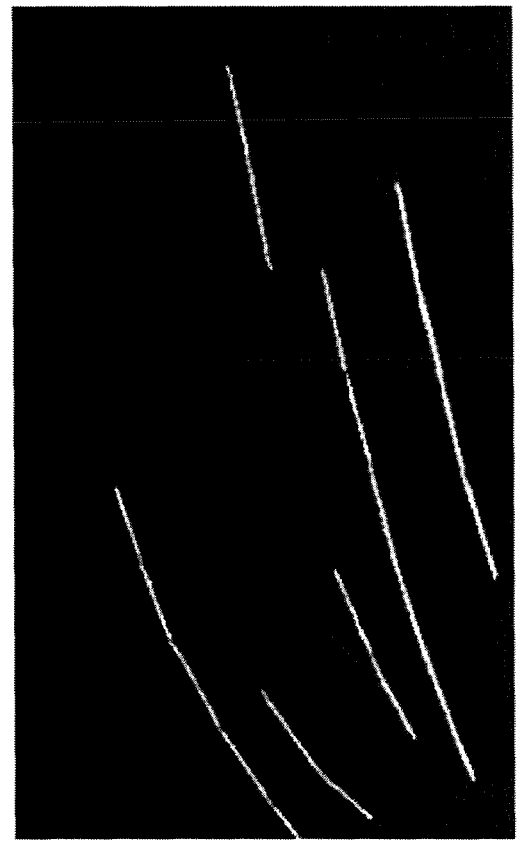

FIG. 13 shows an example image 1310 of training data that includes faults that include a left to right incline and an example image 1330 of augmented training data that includes the faults with a right to left incline. Mirroring of training data using a vertical axis can help reduce directional bias in the training data set. In one embodiment, the training data is mirrored by flipping the data on the vertical axis. In such an example, the image 1310 can provide training data for left to right incline faults (actual training data) and for right to left incline faults (augmented training data) as shown in the image 1330.

Figure 14:
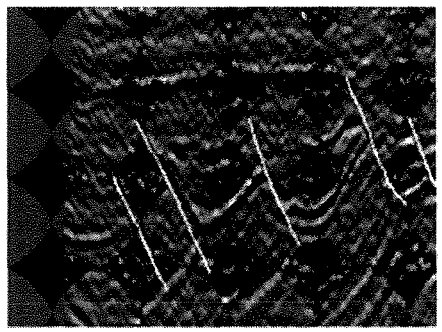
FIG. 14 illustrates examples of thickening.
Figure 14:
Figure 14:
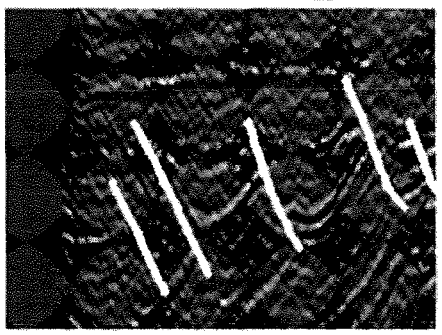
Figure 14:
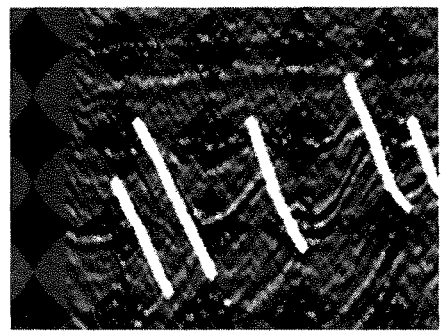
Figure 14:
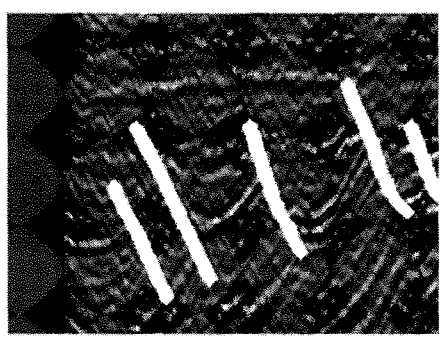
Figure 14:
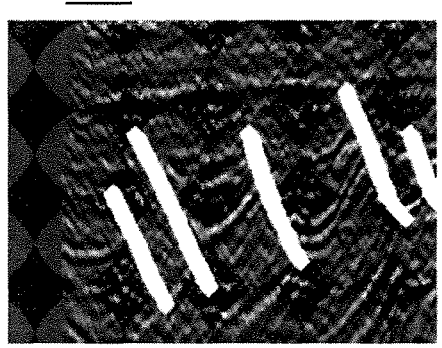
Figure 14:
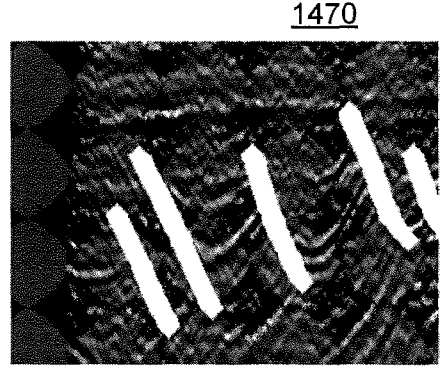

FIG. 14 shows various examples of images 1410, 1420, 1430, 1440, 1450, 1460, and 1470. As shown, geologic features shown in the image 1410 can be increased with respect to their spatial representation in an image, which can help to shift an imbalance of class or category features toward the geologic features shown. For example, an image can include a defined number of elements, which may be pixels. A pixel can be assigned to a class or category that is not of interest (e.g., laterally extensive material in a relatively horizontal layer) or a class or category that is of interest such as a fault. When a pixel is reassigned, the image can be shifted in its balance toward the class or category that is of interest, which can make the image better for training in that the thickening helps to address imbalance in the data. As an example, the image 1410 can be interpreted seismic image data with a minimum pixel thickness of a fault set to be 1 pixel. In the various examples of FIG. 14, pixel thickness is increased for the faults, which may be increased from 1 pixel to 2 pixels, 3 pixels, 4 pixels, 5 pixels, 6 pixels, 7 pixels or another appropriate number of pixels. As an example, an increase may be with respect to an adjacent pixel or adjacent pixels. As an example, for a thickness of 1 pixel, a method can include adding a pixel to either side to increase the thickness to 3 pixels. As an example, a method can include adding a single pixel to one side or another side of a feature or, for example, adding more than a single pixel to a side or sides where more pixels may be added to one side than another side.

As an example, increasing thickness can increase quality of training data with respect to labelling. For example, in the seismic image 1410, a pick of a pixel as corresponding to a fault may be slightly offset from a pixel that actually corresponds to the fault. Where a label is assigned to the picked pixel, that label is lacking in precision or accuracy. For example, the label may be offset by one or more pixels. As an example, consider a label being offset by two pixels from a pixel that actually corresponds to a fault. In such an example, where thickening is applied to the picked pixel to extend adjacently by three pixels, then the pixel that actually corresponds to the fault is associated with the label. In such an example, processing of seismic image data by a trained machine model, as trained using the thickening process, is less impacted by (or not impacted by) such offset errors; rather, the trained machine model is trained using labels that encompass actual locations of faults (e.g., without possible different class information between a label and a fault). As explained, thickening can improve balance and can improve labelling, both of which can improve training data and, ultimately, performance of a trained machine model. As shown in the examples of FIG. 14, as thickening increases (e.g., number of pixels added), labelling offset errors may be diminished. As an example, a method can include adjusting an amount of thickening based on one or more factors such as, for example, desire to shift an imbalance, desire to reduce labelling offset errors, desire to accurately identify a geologic feature(s) in seismic image data, etc.

Figure 15:
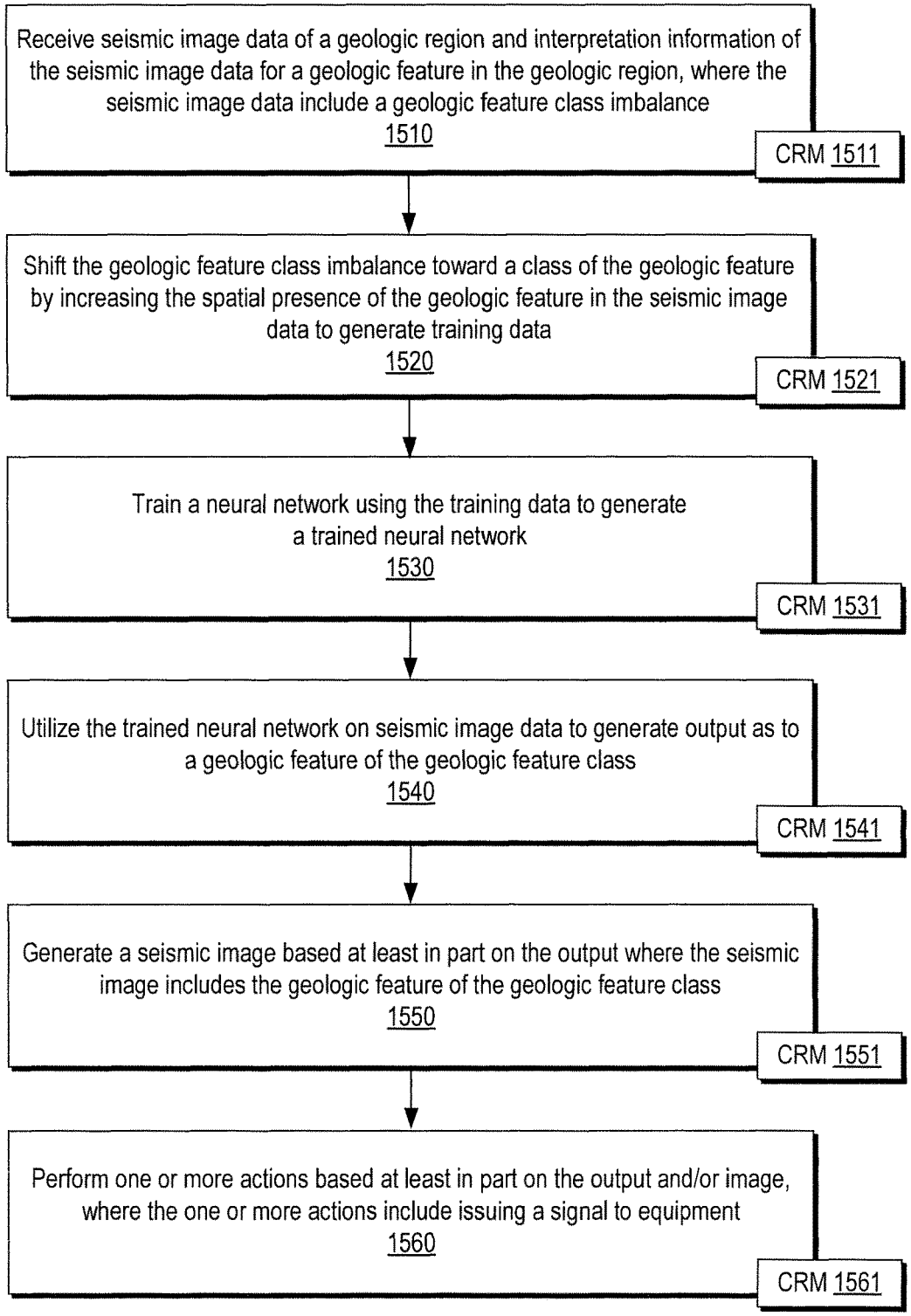
FIG. 15 illustrates an example of a method.

FIG. 15 shows an example of a method 1500 that includes a reception block 1510 for receiving seismic image data of a geologic region and interpretation information of the seismic image data for a geologic feature in the geologic region, where the seismic image data comprise a geologic feature class imbalance; a shift block 1520 for shifting the geologic feature class imbalance toward a class of the geologic feature by increasing the spatial presence of the geologic feature in the seismic image data to generate training data; and a train block 1530 for training a neural network using the training data to generate a trained neural network.

The method 1500 may further include one or more blocks, for example, consider one or more of a utilization block 1540 for utilizing the trained neural network on seismic image data to generate output as to a geologic feature of the geologic feature class; a generation block 1550 for generating a seismic image based at least in part on the output where the seismic image includes the geologic feature of the geologic feature class; and a performance block 1560 for performing one or more actions based at least in part on the output and/or image, where the one or more actions include issuing a signal to equipment.

As an example, the method 1500 of FIG. 15 can include improving seismic image data for purposes of training a machine model (e.g., a neural network model, etc.), improving a training process that trains a machine model, improving a trained machine model, improving operation of a trained machine model, improving a seismic image as to one or more geologic features, and improving an action based on one or more of the aforementioned improvements where the action can include issuing a signal to equipment such that control of the equipment can be improved.

As mentioned, a technological process that aims to produce fluid from a reservoir can depend on the presence of a fault or faults and the location of one or more faults. Where seismic image data are acquired and processed to generate a higher quality seismic image that is of higher quality because presence of a fault can be determined and located via utilization of a specially trained computerized machine model, the technological process of digital seismic image processing is improved.

As an example, a method can pertain to digital image processing that includes taking seismic image data on the front end, modifying the seismic image data, outputting modified seismic image data, generating a trained machine model using the modified seismic image data to generate a trained machine model and processing other seismic image data using the trained machine model to modify that seismic image data such that the seismic image data are of improved quality as to geologic features in that seismic image data.

The method of FIG. 15 is shown along with various computer-readable storage medium or media (CRM) blocks 1511, 1521, 1531, 1541, 1551, and 1561. Such blocks can include processor-executable instructions, for example, as one or more sets of instructions such as the one or more sets of instructions of the block 270 of the system 250 of FIG. 2. A computer-readable storage medium is non-transitory, not a signal and not a carrier wave. A CRM can be a drive that can store information in digital form and that can be accessed via one or more interfaces, for example, to provide information to a processor, which may be a CPU, a core, a GPU, etc.

As an example, a method can include receiving seismic image data of a geologic region and interpretation information of the seismic image data for a geologic feature in the geologic region, where the seismic image data include a geologic feature class imbalance; shifting the geologic feature class imbalance toward a class of the geologic feature by increasing the spatial presence of the geologic feature in the seismic image data to generate training data; and training a neural network using the training data to generate a trained neural network. In such an example, the increasing the spatial presence of the geologic feature can include thickening the geologic feature.

As an example, seismic image data can include and a method can include increasing the spatial presence of a geologic feature by assigning pixels from a different class to the class of the geologic feature to improve labelling of the geologic feature. For example, training data can include labels as to pixels such that the pixels are assigned to a geologic feature class. As an example, a label may be assigned during a picking process whereby a pick may be offset from a pixel that actually corresponds to a geologic feature in a seismic image rendered to a display. Where such an offset exists, the label may be considered to lack precision or accuracy. Where increasing the spatial presence is applied, the increased spatial presence may subsume the pick (e.g., a picked pixel) that was offset such that the label now corresponds to that pick as well as one or more pixels that actually correspond to the geologic feature in the seismic image data. Accordingly, by increasing the spatial presence of a geologic feature, precision or accuracy of labels can be improved, which, in turn, improves the quality of training data, improves training of a machine model, improves the trained machine model and improves operation of the trained machine model to generate higher quality seismic image data given seismic image data as input thereto.

As an example, a method can include increasing the spatial presence by selecting a pixel assigned to the class of the geologic feature and selecting at least one adjacent pixel of the different class and assigning the at least one adjacent pixel to the class of the geologic feature. As an example, a method can include a parameter that specifies how many pixels to increase a pixel of a geologic feature, which may be a picked geologic feature pixel or, for example, an automatically determined geologic feature pixel. As an example, offset error as to a label (e.g., assigned information such as class information) may exist for manual picking and/or for machine picking where such offset error may be addressed at least in part via increasing spatial presence of a pick.

As an example, a geologic feature can be represented by a number of pixels in an image rendered to a display where increasing the spatial presence includes increasing the number of pixels that represent the geologic feature.

As an example, seismic image data can include elements where a geologic feature is represented by a number of the elements and where increasing the spatial presence of the geologic feature includes increasing the number of the elements that represent the geologic feature. In such an example, an element may be a data sample (e.g., as in a seismic trace, a seismic cube, etc.) where the data sample may be an element of a vector or an array of a data structure stored in memory of a machine. As an example, a pixel can be an element of seismic image data and a voxel can be an element of seismic image data.

As an example, a method can include augmenting training data to generate augmented training data. For example, consider mirroring as an augmentation technique. As an example, mirroring can be with respect to a vertical line that can be aligned with the center of the Earth and a point on the surface of the Earth. As an example, a mirroring operation can turn a fault that forms an angle of 10 degrees with respect to a vertical line to a fault that forms an angle of minus 10 degrees with respect to the vertical line. In such an example, mirroring can generate additional training data that can help to reduce bias that may result from seismic image data that exhibits geologic features with orientations that lack some amount of diversity.

As an example, a geologic feature can be a fault. In such an example, in seismic image data, the fault can be of a minimum spatial thickness and a method can include increasing the spatial presence of the geologic feature by increasing the minimum spatial thickness. For example, consider an interpretation process that assigns pixels in a seismic image to be associated with a fault. In such an example, collectively, for the fault, the minimum spatial thickness might be one pixel. As mentioned, a method that increases spatial thickness can reduce imbalance and can improve precision or accuracy of labels (e.g., assignments to pixels).

As an example, a method can include cropping seismic image data. As an example, a method can include discarding one or more portions of seismic image data based on geologic feature presence. As an example, a method can include tiling the seismic image data where, for example, tiling generates overlapping tiles (see, e.g., the example image 1130 of FIG. 11).

As an example, a method can include cropping a seismic image data cube (e.g., manually and/or automatically via machine automation) into sections, splitting sections into smaller tiles (see, e.g., FIG. 11), discarding tiles (e.g., rather than entire sections) that do not include a desired geologic feature (e.g., discarding tiles without identified fault or faults), and, for example, mirroring at least some of the tiles to generate augmented training data, which may be used in addition to the un-mirrored training data resulting from the foregoing process of cropping, splitting and discarding. Such a method can help to reduce class imbalance and/or bias in seismic image data for purposes of training one or more machine models.

As an example, a method can include receiving seismic image data of a seismic survey and processing the seismic image data using a trained neural network to output an enhanced seismic image that includes instances of geologic features that correspond to a class of a geologic feature for which the trained neural network was trained (e.g., via improved training data). As an example, a method can include performing a field operation based at least in part on an enhanced seismic image. For example, the enhanced seismic image may indicate the location of a fault where that location is improved in the enhanced seismic image through use of improved training data for generating a trained neural network as a computational machine model. A drilling operation can be performed in a manner that may aim to steer a distance clear of the fault, which may help to improve stability of a borehole formed by the drilling operation.

As an example, a method can include training a neural network as a machine mode via determining weights of the neural network. As an example, such a process may be iterative. As an example, a training process can be based on enhanced labelled features in seismic image data where training involves tuning a machine model to identify such features based on the seismic image data, as enhanced. As an example, a training process for a neural network can include using training data from a plurality of seismic image data sets.

As an example, a system can include a processor; memory; processor-executable instructions executable by the processor to instruct the system to: receive seismic image data of a geologic region and interpretation information of the seismic image data for a geologic feature in the geologic region, where the seismic image data include a geologic feature class imbalance; shift the geologic feature class imbalance toward a class of the geologic feature by increasing the spatial presence of the geologic feature in the seismic image data to generate training data; and train a neural network using the training data to generate a trained neural network.

As an example, one or more computer-readable storage media that include computer-executable instructions to instruct a computing system can include instructions to: receive seismic image data of a geologic region and interpretation information of the seismic image data for a geologic feature in the geologic region, where the seismic image data include a geologic feature class imbalance; shift the geologic feature class imbalance toward a class of the geologic feature by increasing the spatial presence of the geologic feature in the seismic image data to generate training data; and train a neural network using the training data to generate a trained neural network.

Figure 16:
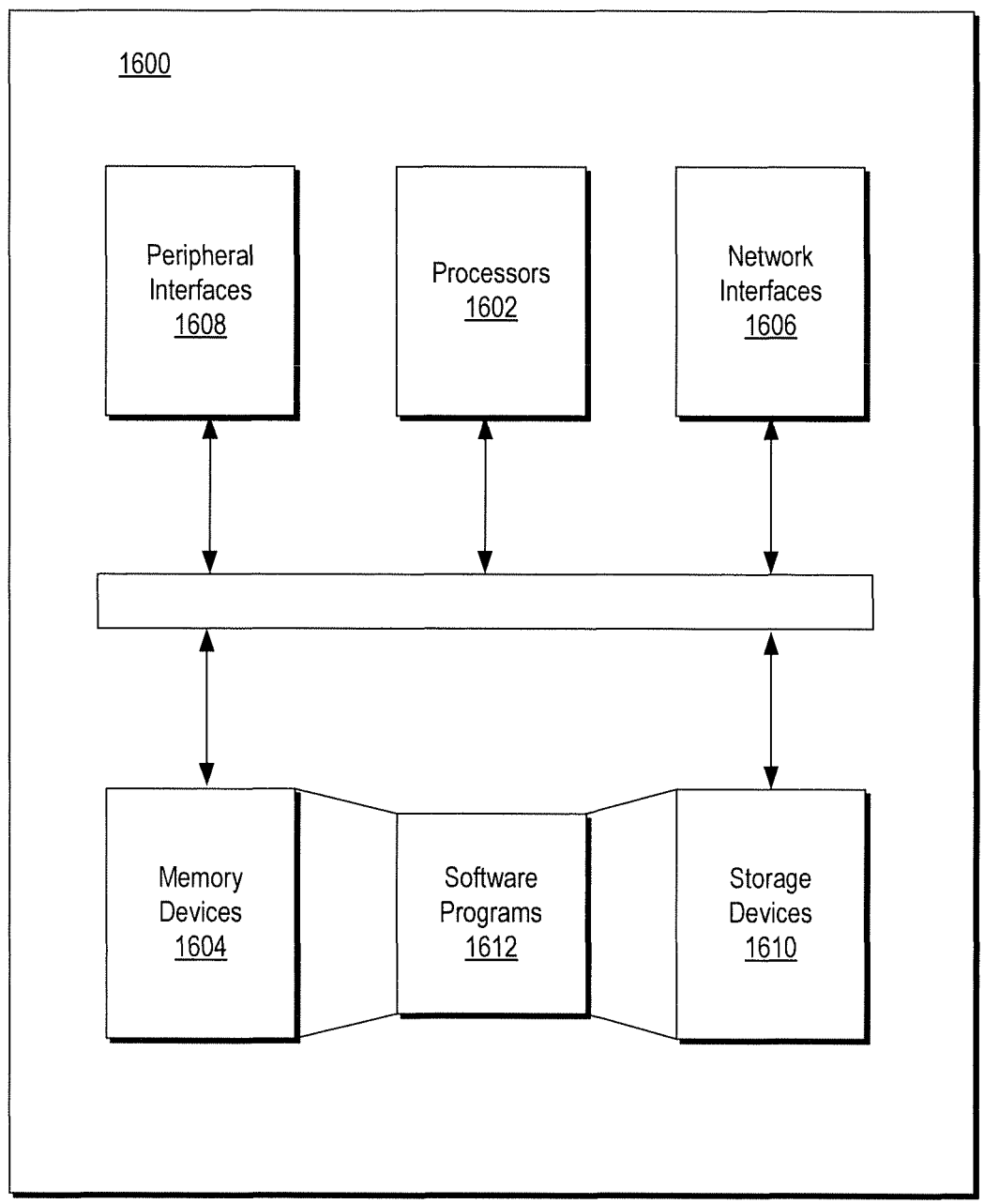
FIG. 16 illustrates an example of a system.

Embodiments of the disclosure may also include one or more systems for implementing one or more embodiments of the method for identifying stratigraphic units using machine learning. FIG. 16 illustrates a schematic view of such a computing or processor system 1600, according to an embodiment. The processor system 1600 may include one or more processors 1602 of varying core configurations (including multiple cores) and clock frequencies. The one or more processors 1602 may be operable to execute instructions, apply logic, etc. It will be appreciated that these functions may be provided by multiple processors or multiple cores on a single chip operating in parallel and/or communicably linked together. In at least one embodiment, the one or more processors 1602 may be or include one or more GPUs.

The processor system 1600 may also include a memory system, which may be or include one or more memory devices and/or computer-readable media 1604 of varying physical dimensions, accessibility, storage capacities, etc. such as flash drives, hard drives, disks, random access memory, etc., for storing data, such as images, files, and program instructions for execution by the processor 1602. In an embodiment, the computer-readable media 1604 may store instructions that, when executed by the processor 1602, are configured to cause the processor system 1600 to perform operations. For example, execution of such instructions may cause the processor system 1600 to implement one or more portions and/or embodiments of the method(s) described above.

The processor system 1600 may also include one or more network interfaces 1606. The network interfaces 1606 may include hardware, applications, and/or other software. Accordingly, the network interfaces 1606 may include Ethernet adapters, wireless transceivers, PCI interfaces, and/or serial network components, for communicating over wired or wireless media using protocols, such as Ethernet, wireless Ethernet, etc.

As an example, the processor system 1600 may be a mobile device that includes one or more network interfaces for communication of information. For example, a mobile device may include a wireless network interface (e.g., operable via one or more IEEE 802.11 protocols, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

The processor system 1600 may further include one or more peripheral interfaces 1608, for communication with a display, projector, keyboards, mice, touchpads, sensors, other types of input and/or output peripherals, and/or the like. In some implementations, the components of processor system 1600 are not necessarily enclosed within a single enclosure or even located in close proximity to one another, but in other implementations, the components and/or others may be provided in a single enclosure. As an example, a system may be a distributed environment, for example, a so-called "cloud" environment where various devices, components, etc. interact for purposes of data storage, communications, computing, etc. As an example, a method may be implemented in a distributed environment (e.g., wholly or in part as a cloud-based service).

As an example, information may be input from a display (e.g., a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

The memory device 1604 may be physically or logically arranged or configured to store data on one or more storage devices 1610. The storage device 1610 may include one or more file systems or databases in any suitable format. The storage device 1610 may also include one or more software programs 1612, which may contain interpretable or executable instructions for performing one or more of the disclosed processes. When requested by the processor 1602, one or more of the software programs 1612, or a portion thereof, may be loaded from the storage devices 1610 to the memory devices 1604 for execution by the processor 1602.

The processor system 1600 may also be implemented in part or in whole by electronic circuit components or processors, such as application-specific integrated circuits (ASICs) or field-programmable gate arrays (FPGAs).

The foregoing description of the present disclosure, along with its associated embodiments and examples, has been presented for purposes of illustration. It is not exhaustive and does not limit the present disclosure to the precise form disclosed. Those skilled in the art will appreciate from the foregoing description that modifications and variations are possible in light of the above teachings or may be acquired from practicing the disclosed embodiments.

For example, the same techniques described herein with reference to the processor system 1600 may be used to execute programs according to instructions received from another program or from another processor system altogether. Similarly, commands may be received, executed, and their output returned entirely within the processing and/or memory of the processor system 1600.

As an example, one or more computer-readable storage media can include computer-executable instructions executable to instruct a computing system to perform one or more methods or portions thereof described herein.

As an example, a workflow may be associated with various computer-readable medium (CRM) blocks. Such blocks generally include instructions suitable for execution by one or more processors (or cores) to instruct a computing device or system to perform one or more actions. As an example, a single medium may be configured with instructions to allow for, at least in part, performance of various actions of a workflow. As an example, a computer-readable medium (CRM) may be a computer-readable storage medium that is non-transitory, not a carrier wave and not a signal. As an example, blocks may be provided as one or more sets of instructions, for example, such as the one or more sets of instructions 270 of the system 250 of FIG. 2.

Figure 17:
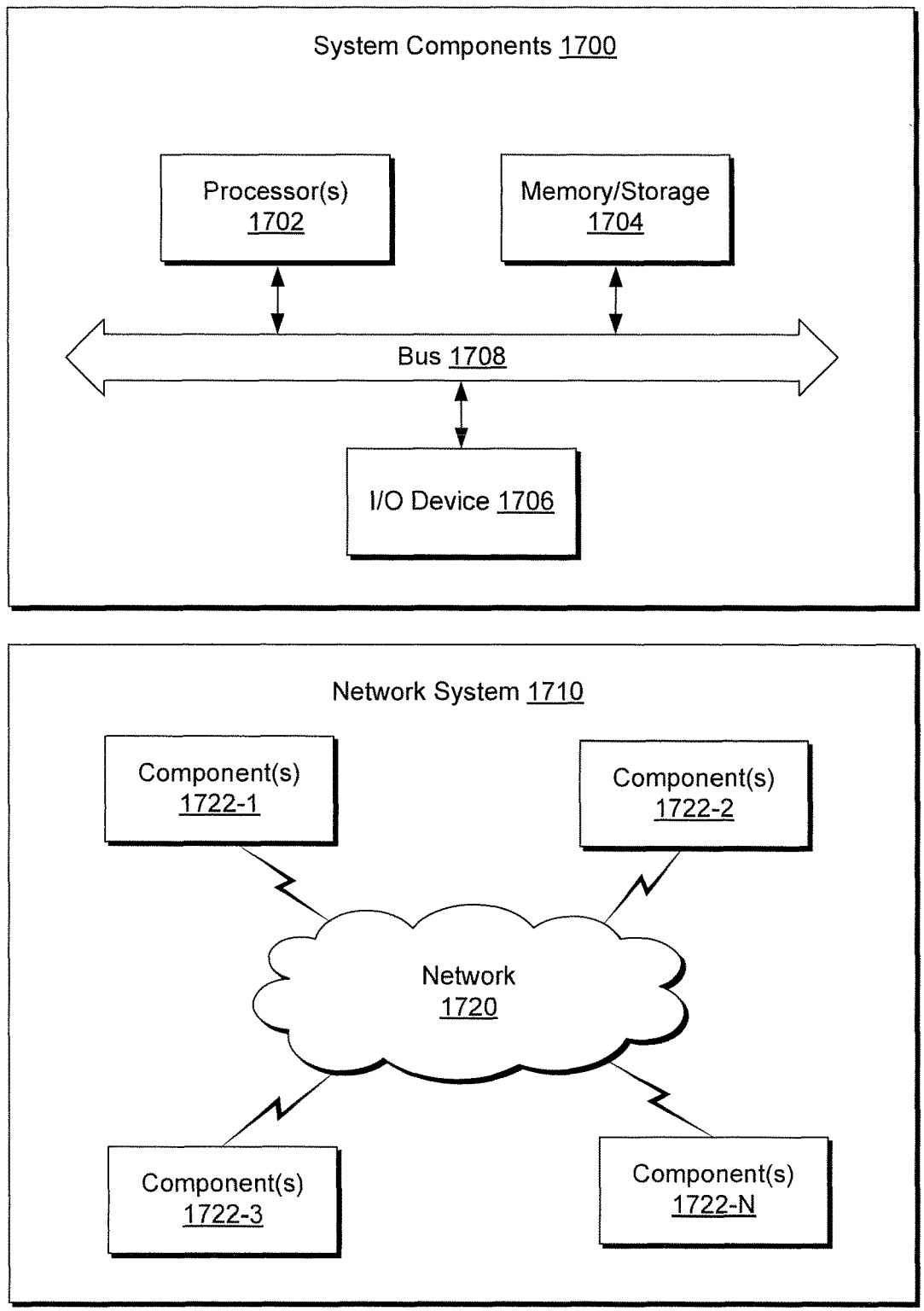
FIG. 17 illustrates example components of a system and a networked system.

FIG. 17 shows components of an example of a computing system 1700 and an example of a networked system 1710. The system 1700 includes one or more processors 1702, memory and/or storage components 1704, one or more input and/or output devices 1706 and a bus 1708. In an example embodiment, instructions may be stored in one or more computer-readable media (e.g., memory/storage components 1704). Such instructions may be read by one or more processors (e.g., the processor(s) 1702) via a communication bus (e.g., the bus 1708), which may be wired or wireless. The one or more processors may execute such instructions to implement (wholly or in part) one or more attributes (e.g., as part of a method). A user may view output from and interact with a process via an I/O device (e.g., the device 1706). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1710. The network system 1710 includes components 1722-1, 1722-2, 1722-3, . . . 1722-N. For example, the components 1722-1 may include the processor(s) 1702 while the component(s) 1722-3 may include memory accessible by the processor(s) 1702. Further, the component(s) 1702-2 may include an I/O device for display and optionally interaction with a method. The network may be or include the Internet, an intranet, a cellular network, a satellite network, etc.

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method (1500) comprising:
   receiving seismic image data of a geologic region and interpretation information of the seismic image data for a geologic feature in the geologic region, wherein the seismic image data comprise a geologic feature class imbalance (1510);
   shifting the geologic feature class imbalance toward a class of the geologic feature by increasing the spatial presence of the geologic feature in the seismic image data to generate training data (1520); and
   training a neural network using the training data to generate a trained neural network (1530).

2. The method of claim 1 wherein the increasing the spatial presence of the geologic feature comprises thickening the geologic feature.

3. The method of claim 1 wherein the seismic image data comprises pixels and wherein the increasing the spatial presence of the geologic feature comprises assigning pixels from a different class to the class of the geologic feature to improve labelling of the geologic feature optionally wherein the increasing the spatial presence comprises selecting a pixel assigned to the class of the geologic feature and selecting at least one adjacent pixel of the different class and assigning the at least one adjacent pixel to the class of the geologic feature.

4. The method of claim 1 wherein the geologic feature is represented by a number of pixels in an image rendered to a display and the increasing the spatial presence comprises increasing the number of pixels that represent the geologic feature.

5. The method of claim 1 wherein the seismic image data comprises elements wherein the geologic feature is represented by a number of the elements and wherein increasing the spatial presence comprises increasing the number of the elements that represent the geologic feature.

6. The method of claim 1 comprising augmenting the training data to generate augmented training data, optionally wherein the augmenting comprises mirroring.

7. The method of claim 1 wherein the geologic feature comprises a fault, optionally wherein the fault comprises a minimum spatial thickness and wherein increasing the spatial presence comprises increasing the minimum spatial thickness.

8. The method of claim 1 comprising cropping the seismic image data.

9. The method of claim 1 comprising discarding one or more portions of the seismic image data based on geologic feature presence.

10. The method of claim 1 comprising tiling the seismic image data, optionally wherein the tiling generates overlapping tiles.

11. The method of claim 1 comprising receiving seismic image data of a seismic survey and processing the seismic image data using the trained neural network to output an enhanced seismic image that comprises instances of geologic features that correspond to the class of the geologic feature, optionally comprising performing a field operation based at least in part on the enhanced seismic image.

12. The method of claim 1 wherein the training comprises determining weights of the neural network.

13. The method of claim 1 wherein the training comprises training the neural network using training data from a plurality of seismic image data sets.

14. A system (250) comprising:
   a processor (256);
   memory (258);
   processor-executable instructions (270) executable by the processor to instruct the system to:
      receive seismic image data of a geologic region and interpretation information of the seismic image data for a geologic feature in the geologic region, wherein the seismic image data comprises a geologic feature class imbalance (1511);
      shift the geologic feature class imbalance toward a class of the geologic feature by increasing the spatial presence of the geologic feature in the seismic image data to generate training data (1521); and
      train a neural network using the training data to generate a trained neural network (1531).

* * * * *